US011625188B2

(12) United States Patent
Lee et al.

(10) Patent No.: US 11,625,188 B2
(45) Date of Patent: Apr. 11, 2023

(54) NONVOLATILE MEMORY DEVICE HAVING RESISTIVE MEMORY CELLS AND A CONTROLLER TO DETECT FAIL CELLS, AND ELECTRONIC DEVICE INCLUDING THE SAME

(71) Applicant: SAMSUNG ELECTRONICS CO., LTD., Suwon-si (KR)

(72) Inventors: Jung Hyuk Lee, Hwaseong-si (KR); Hye Min Shin, Suwon-si (KR); Kang Ho Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 17/172,299

(22) Filed: Feb. 10, 2021

(65) Prior Publication Data
US 2021/0397366 A1 Dec. 23, 2021

(30) Foreign Application Priority Data
Jun. 23, 2020 (KR) .................. 10-2020-0076231

(51) Int. Cl.
*G06F 3/06* (2006.01)
*G06F 11/10* (2006.01)

(52) U.S. Cl.
CPC .......... *G06F 3/0655* (2013.01); *G06F 3/0604* (2013.01); *G06F 3/0619* (2013.01); *G06F 3/0659* (2013.01); *G06F 3/0679* (2013.01); *G06F 11/1012* (2013.01)

(58) Field of Classification Search
CPC .............. G06F 3/0619; G11C 11/1677; G11C 11/1012; G11C 11/1048
See application file for complete search history.

(56) References Cited

U.S. PATENT DOCUMENTS

| | | | |
|---|---|---|---|
| 8,756,464 B2 | 6/2014 | Kim et al. | |
| 8,832,391 B2 | 9/2014 | Choi | |
| 8,848,465 B2 | 9/2014 | Kim et al. | |
| 9,110,829 B2 | 8/2015 | Chih et al. | |
| 9,454,432 B2 | 9/2016 | Alam et al. | |
| 9,569,305 B2 | 2/2017 | Mukai | |
| 9,778,985 B1* | 10/2017 | Kim | G11C 16/10 |
| 10,037,816 B2 | 7/2018 | Lee et al. | |
| 10,545,804 B2 | 1/2020 | Shinbashi et al. | |
| 2012/0079346 A1 | 3/2012 | Fukuda | |

(Continued)

*Primary Examiner* — David Yi
*Assistant Examiner* — Nicholas A. Paperno
(74) *Attorney, Agent, or Firm* — Lee IP Law, P.C.

(57) ABSTRACT

A memory device includes a first nonvolatile memory including a resistive memory cell; and a controller. The controller may be configured to provide the first nonvolatile memory with a first data, a first program command, and a first address. The controller may be configured to receive a second data, which is a verify read from the resistive memory cell programmed with the first data, from the first nonvolatile memory in response to the first program command. The controller may be configured to compare the first data with the second data to detect a number of fail cells. When the number of detected fail cells is greater than a reference value, the controller may be configured to generate a third data obtained by inversing the first data, and provide the third data to the first nonvolatile memory. The first data may include an inversion flag bit.

18 Claims, 23 Drawing Sheets

(56) References Cited

U.S. PATENT DOCUMENTS

| | | | |
|---|---|---|---|
| 2013/0010550 A1* | 1/2013 | Kim | G11C 7/1006 365/189.15 |
| 2014/0016404 A1 | 1/2014 | Kim et al. | |
| 2014/0157088 A1* | 6/2014 | Chih | G06F 11/1004 714/746 |
| 2015/0228357 A1* | 8/2015 | Arsovski | G11C 29/06 365/154 |
| 2017/0046223 A1* | 2/2017 | Kern | G11C 29/52 |
| 2018/0210669 A1 | 7/2018 | Lee | |
| 2020/0243154 A1* | 7/2020 | Sity | G11C 29/38 |

* cited by examiner

FIG. 10

| | Inversion flag bit | Data bit | | | | | | | | | ECC parity bit | | | | |
|---|---|---|---|---|---|---|---|---|---|---|---|---|---|---|---|
| D1 | 0 | 0 | 1 | 1 | 0 | 1 | 0 | 0 | 1 | 0 | 1 | 1 | 0 | 1 | 0 | 0 |
| D2 | 0 | 0 | 1 | 1 | 0 | 1 | 0 | 0 | 1 | 0 | 1 | 1 | 0 | 1 | 0 | 0 |
| D3 | 1 | 1 | 0 | 0 | 1 | 0 | 1 | 1 | 0 | 1 | 0 | 0 | 1 | 0 | 1 | 1 |

Fail bits

FIG. 15

NONVOLATILE MEMORY DEVICE HAVING RESISTIVE MEMORY CELLS AND A CONTROLLER TO DETECT FAIL CELLS, AND ELECTRONIC DEVICE INCLUDING THE SAME

Korean Patent Application No. 10-2020-0076231, filed on Jun. 23, 2020, in the Korean Intellectual Property Office, and entitled: "Memory Device Including a Resistive Memory Cell and Electronic Device Including the Same," is incorporated by reference herein in its entirety.

BACKGROUND

1. Field

Embodiments relate to a memory device including a resistive memory cell, and an electronic device including the same.

2. Description of the Related Art

As nonvolatile memory devices that use a resistance material, there are a phase change memory device (PRAM: Phase change Random Access Memory), a resistive memory device (RRAM: Resistive RAM), a magnetic memory device (MRAM: Magnetic RAM) and the like. A dynamic memory device (DRAM) and a flash memory device store data using charge, and meanwhile, a nonvolatile memory device that uses the resistance material to store data, using a state change (PRAM) of a phase change material such as a chalcogenide alloy, a resistance change (RRAM) of a variable resistance material, a resistance change (MRAM) of a MTJ (Magnetic Tunnel Junction) thin film according to a magnetization state of a ferromagnetic material, and the like.

The MRAM (Magnetic Random Access Memory) has received much attention due to high reading and writing speeds, high durability, non-volatility, and low power consumption while operations are performed. Further, the MRAM may also store information, using a magnetic material as an information-storage medium.

SUMMARY

Embodiments are directed to a memory device, including: a first nonvolatile memory including a resistive memory cell; and a controller configured to control the first nonvolatile memory. The controller may be configured to provide the first nonvolatile memory with a first data, a first program command, and a first address. The controller may be configured to receive a second data, which is a verify read from the resistive memory cell programmed with the first data, from the first nonvolatile memory in response to the first program command. The controller may be configured to compare the first data with the second data to detect a number of fail cells. When the number of detected fail cells is greater than a reference value, the controller may be configured to generate a third data obtained by inversing the first data, and provide the third data to the first nonvolatile memory. The first data may include an inversion flag bit.

Embodiments are also directed to a memory device, including: a memory cell array including a resistive memory cell; a read/write circuit connected to the memory cell array through a bit line; an address decoder connected to the memory cell array through a word line; and a control logic connected to the read/write circuit and the address decoder. The read/write circuit may be connected to a controller. The read/write circuit may be configured to receive a first data including an inversion flag bit. The control logic may be configured to receive a first program command. The address decoder may be configured to receive a first address. The read/write circuit, the control logic, and the address decoder may be configured to program the resistive memory cell, on the basis of the first data, the first program command, and the first address. The read/write circuit may be configured to provide the controller with a second data generated by applying a verify voltage to the bit line to which the resistive memory cell is connected. The read/write circuit may be configured to receive a third data obtained by inversing the first data, from the controller in response to the second data, when a number of fail cells detected by comparing the first and second data is greater than a reference value. The read/write circuit, the control logic, and the address decoder may be configured to program the resistive memory cell, on the basis of the third data, the first program command and the first address.

Embodiments are also directed to an electronic device, including: a nonvolatile memory including a resistive memory cell; a controller that is configured to control the nonvolatile memory; and a host that is configured to provide the controller with a program command and a read command. The controller may be configured to provide the nonvolatile memory with a first data, the program command, and an address. The controller may be configured to receive a second data that is a verify read from the resistive memory cell programmed with the first data, from the nonvolatile memory in response to the program command. The controller may be configured to provide the nonvolatile memory with a third data obtained by inversing the first data, when a number of fail cells detected by comparing the first and second data is greater than a reference value. The nonvolatile memory may be configured to program the resistive memory cell with the third data. The host may be configured to provide the controller with the read command and the address. The controller may be configured to provide the nonvolatile memory with the read command and the address, receive a fourth data obtained by reading the resistive memory cell from the nonvolatile memory in response to the read command, and provide the host with a fifth data obtained by inversing the fourth data. The first data may include an inversion flag bit.

BRIEF DESCRIPTION OF THE DRAWINGS

Features will become apparent to those of skill in the art by describing in detail example embodiments with reference to the attached drawings in which:

FIG. 10 is a diagram showing data according to some example embodiments.

FIG. 15 is a diagram showing data according to some example embodiments.

DETAILED DESCRIPTION

Hereinafter, example embodiments will be explained with reference to the accompanying drawings.

Hereinafter, an electronic device 1 including a nonvolatile memory 200 will be explained with reference to FIGS. 1 to 4.

Figure 1:
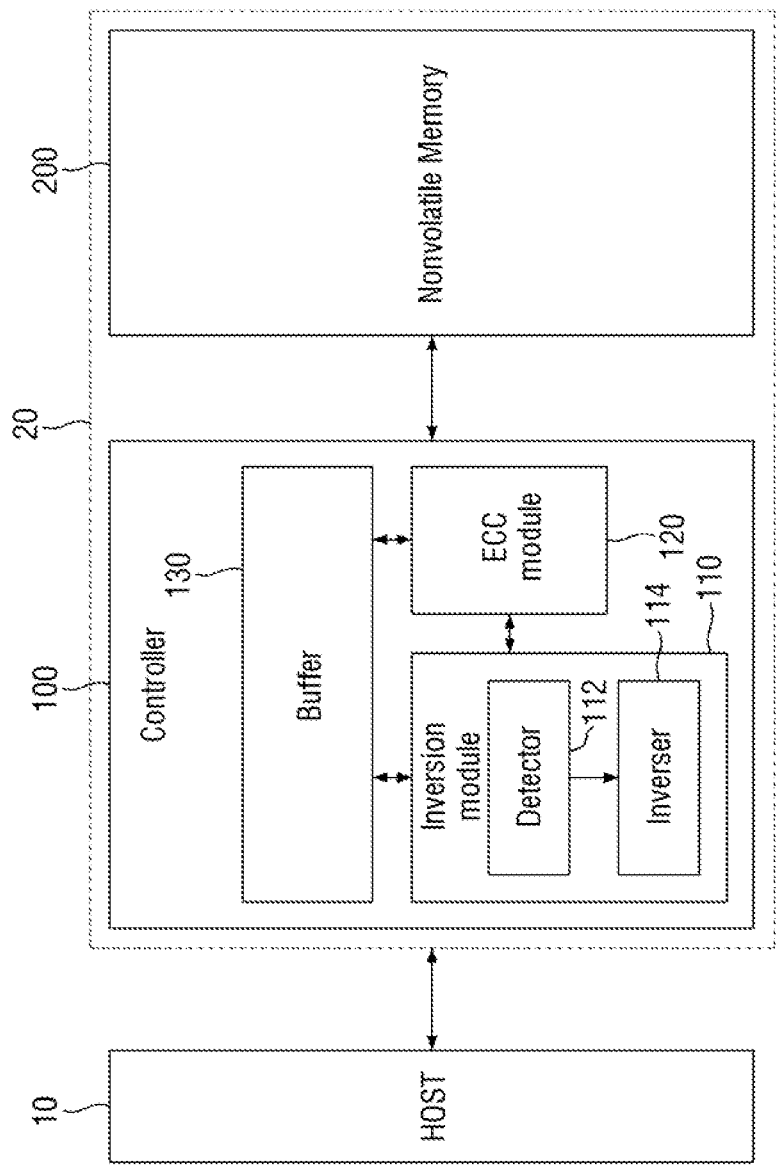
FIG. 1 is a block diagram for explaining an electronic device according to some example embodiments.
Figure 2:
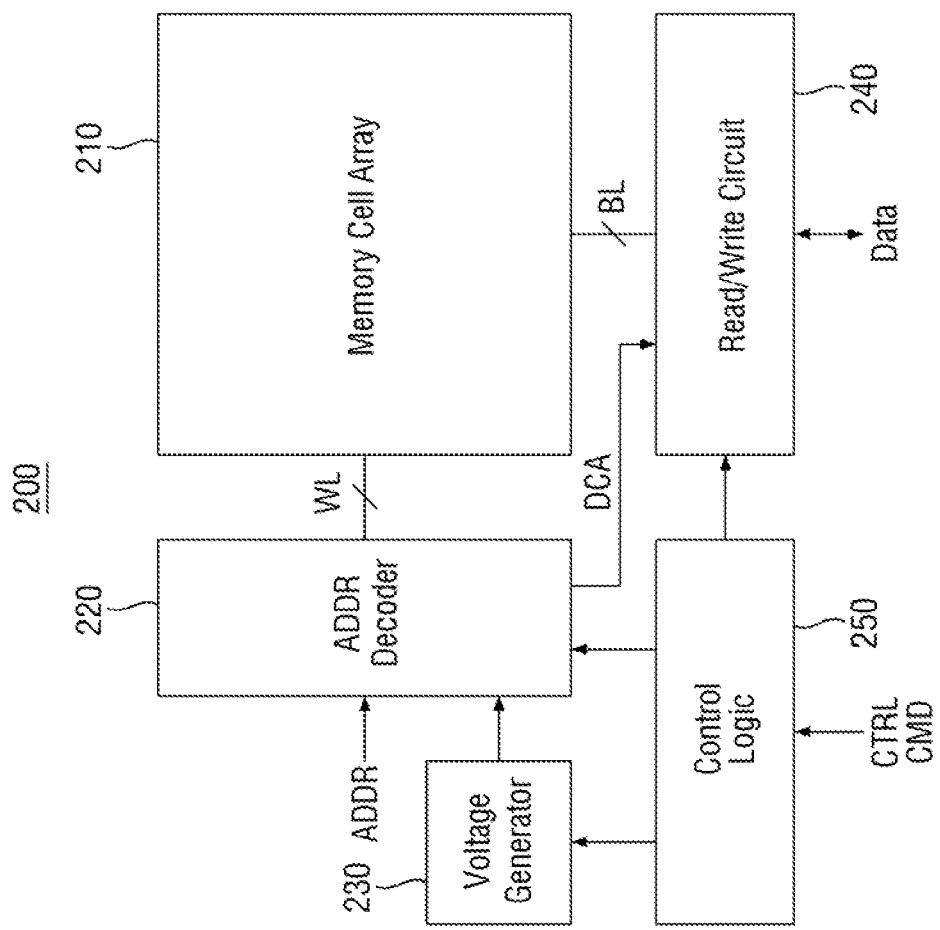
FIG. 2 is a block diagram for explaining the nonvolatile memory of FIG. 1.
Figure 3:
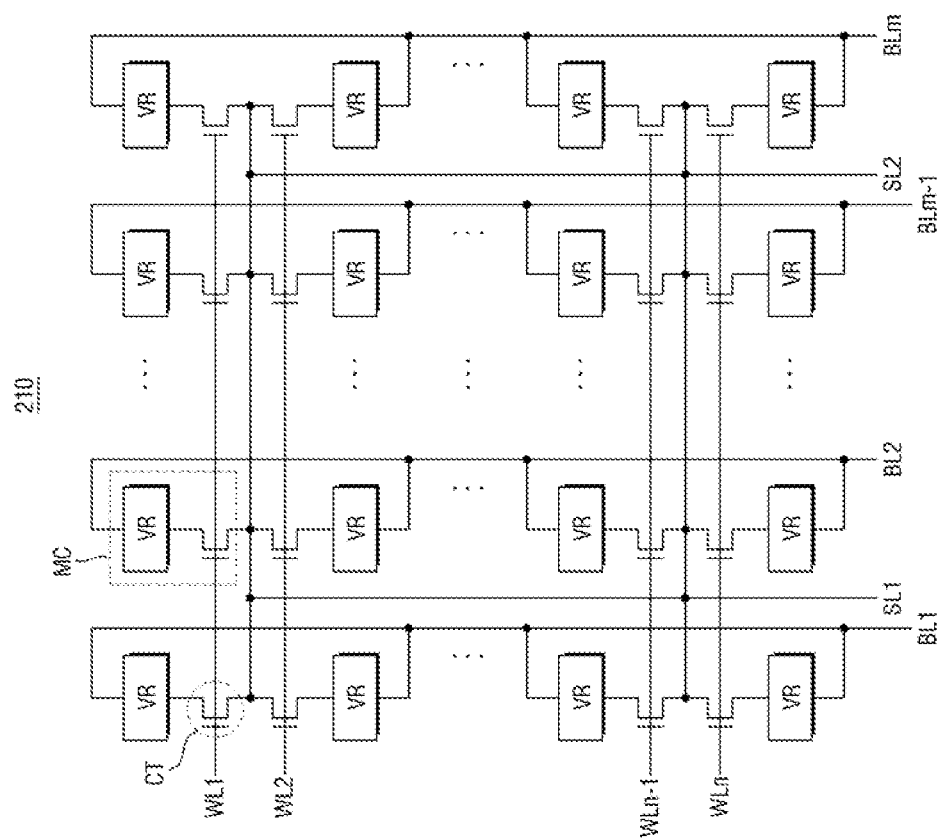
FIG. 3 is a diagram showing a memory cell array of FIG. 2.
Figure 4:
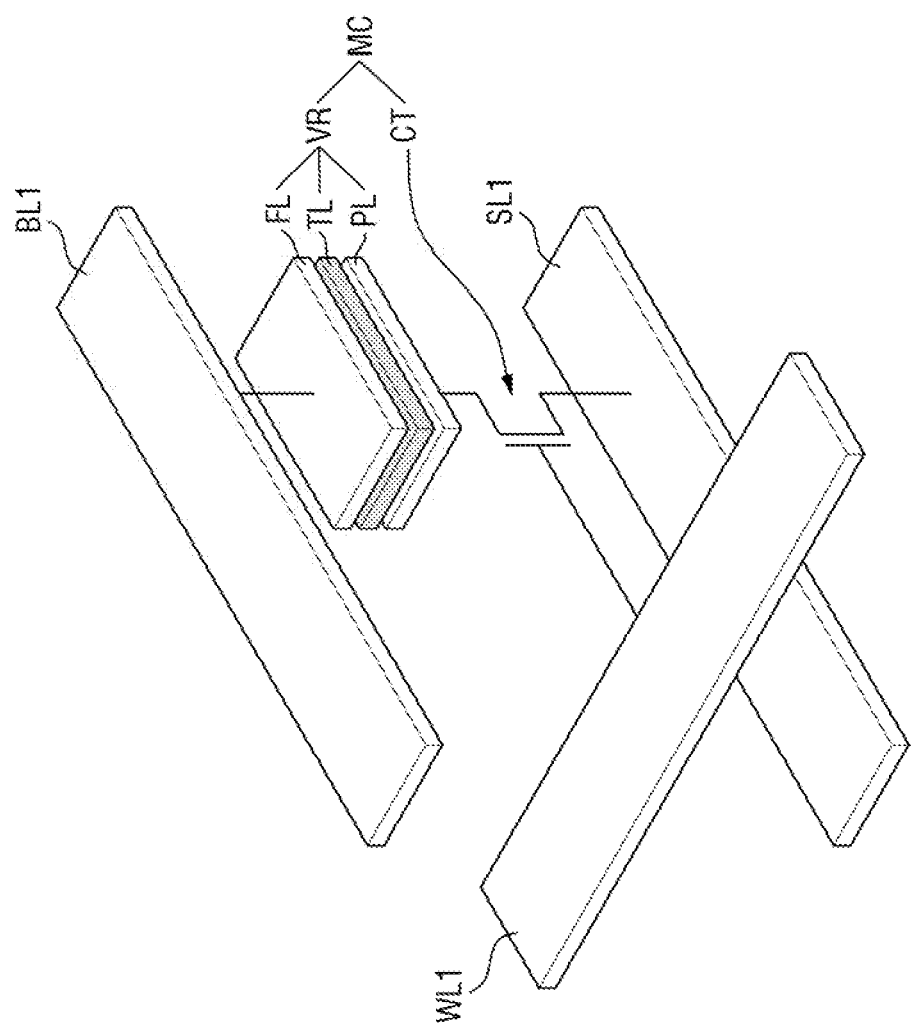
FIG. 4 is an example diagram showing a memory cell of the memory cell array of FIG. 3.

FIG. 1 is a block diagram for explaining an electronic device according to some example embodiments. FIG. 2 is a block diagram for explaining the nonvolatile memory of FIG. 1. FIG. 3 is a diagram showing a memory cell array of FIG. 2. FIG. 4 is an example diagram showing a memory cell of the memory cell array of FIG. 3.

Referring to FIG. 1, an electronic device 1 may include a host 10 and a memory device 20.

In some example embodiments, the host 10 may be connected to the memory device 20 through an interface. In some example embodiments, the host 10 may transfer a signal to the memory device 20 to control the memory device 20. Further, for example, the host 10 may receive a signal from the memory device 20 to process data included in the signal.

In some example embodiments, the host 10 may include a central processing unit (CPU), a controller, an application specific integrated circuit (ASIC), or the like. Also, for example, the host 10 may include a memory chip such as a DRAM (Dynamic Random Access Memory), an SRAM (Static RAM), a PRAM (Phase-change RAM), a MRAM (Magneto resistive RAM), a FeRAM (Ferroelectric RAM) and a RRAM (Resistive RAM).

The memory device 20 may include a controller 100 and a nonvolatile memory 200. In some example embodiments, the nonvolatile memory 200 may include a MRAM (magnetic random access memory), a PRAM (phase-change RAM), a RRAM (Resistive RAM), and the like. The nonvolatile memory 200 may be other than a resistive memory, and may include various nonvolatile memories such as an EPROM (Electrically Erasable and Programmable ROM), a flash memory, and a FRAM (Ferroelectric RAM).

The controller 100 and the nonvolatile memory 200 may be connected to each other through an interface. The controller 100 may access the nonvolatile memory 200. In some example embodiments, the controller 100 may control read, write, and erase operations of the nonvolatile memory 200. The controller 100 may serve as an interface between the host 10 and the nonvolatile memory 200. The controller 100 may operate with a firmware for controlling the nonvolatile memory 200.

The controller 100 may include an inversion module 110, an error correction code module 120 (ECC module), a buffer 130, and the like. The inversion module 110, the error correction code module 120, and the buffer 130 may be electrically connected to each other through respective interfaces. In addition, the inversion module 110, the error correction code module 120, and the buffer 130 may mutually send and receive signals including the data.

In some example embodiments, the inversion module 110 may include a detector 112 and an inverser 114. However, in some other example embodiments, the inversion module 110 does not include the detector 112 and the inverser 114, and may operate by itself. Further, the operation of the inversion module 110 may also be performed by the controller 100 itself. The operation of the inversion module 110 including the detector 112 and the inverser 114 will be explained below.

The error correction code module 120 may add a parity to the data to be programmed in the nonvolatile memory 200. The error correction code module 120 may correct an error of the data to be read, on the basis of the data to be read from the nonvolatile memory 200 and the parity. The error correction code module 120 may generate the parity and correct errors, using at least one of various codes, such as an LDPC (Low Density Parity Check) code, a BCH (Bose-Chaudhuri-Hocquenghem) code, an RS (Reed-Solomon) code, and a Polar code.

The buffer 130 may, for example, temporarily store data provided from the configurations of the controller 100, the host 10, and the nonvolatile memory 200. Further, the buffer 130 may provide the temporarily stored data to the configurations of the controller 100, the host 10, and the nonvolatile memory 200. In some example embodiments, the buffer 130 may include a volatile memory such as a dynamic random access memory (DRAM) or a static random access memory (SRAM), and may also include a nonvolatile memory such as a flash memory, a PRAM (Phase-change Random Access Memory), a MRAM (Magnetic Random Access Memory), a ReRAM (Resistive Random Access Memory), and a FRAM (Ferroelectric Random Access Memory).

Although the buffer 130 is shown as being included in the controller 100, the buffer 130 may be included in the nonvolatile memory 200. In some example embodiments, the buffer 130 may be a page buffer of the read/write circuit 240.

An interface between the host 10 and the memory device 20 may include, for example, various communication standards, such as a USB (Universal Serial Bus), a MMC (multimedia card), a PCI (peripheral component interconnection), a PCI-E (PCI-Express), an ATA (Advanced Technology Attachment), a Serial-ATA, a Parallel-ATA, a SCSI (small computer small interface), an ESDI (enhanced small disk interface), an IDE (Integrated Drive Electronics), and a Firewire.

The memory device 20 may include a PC card (PCMCIA, personal computer memory card international association), a compact flash card (CF), a smart media card (SM, SMC), a memory stick, a multimedia card (MMC, RS-MMC, and MMCmicro), an SD card (SD, miniSD, microSD, and SDHC), a universal flash storage (UFS), and the like. Further, the memory device 20 may include a solid state drive (SSD) integrated in a single semiconductor device.

Referring to FIG. 2, the nonvolatile memory 200 may include a memory cell array 210, an address decoder 220, a voltage generator 230, a read/write circuit 240, and a control logic 250.

The memory cell array 210 may be connected to the address decoder 220 through word lines WL. The memory cell array 210 may be connected to the read/write circuit 240 through bit lines BL. The memory cell array 210 may include a plurality of memory cells (e.g., memory cells MC). In some example embodiments, memory cells arranged in a row direction may be connected to the word lines WL. In some example embodiments, memory cells arranged in a column direction may be connected to the bit lines BL.

The address decoder 220 may be connected to the memory cell array 210 through the word lines WL. The address decoder 220 may operate in response to the control of the control logic 250. The address decoder 220 may receive an address ADDR from the controller 100. The address decoder 220 may receive a voltage for operations, such as programming and reading, from the voltage generator 230.

The address decoder 220 may decode the row address of the received address ADDR.

The address decoder 220 may select the word line WL, using the decoded row address. The decoded column address DCA may be provided to the read/write circuit 240. In some example embodiments, the address decoder 220 may include a row decoder, a column decoder, an address buffer, and the like.

The voltage generator 230 may generate a voltage for an access operation in accordance with the control of the control logic 250. In some example embodiments, the voltage generator 230 may generate a program voltage and a program verify voltage for performing the program operation. In some example embodiments, the voltage generator 230 may generate read voltages for performing a read operation, and may generate an erase voltage and an erase verify voltage for performing an erase operation. Further, the voltage generator 230 may provide the voltage for performing each operation to the address decoder 220.

The read/write circuit 240 may be connected to the memory cell array 210 through the bit lines BL. The read/write circuit 240 may transmit and receive data to and from the controller 100. The read/write circuit 240 may operate in response to the control of the control logic 250. The read/write circuit 240 may receive the decoded column address DCA from the address decoder 220. The read/write circuit 240 may select the bit line BL, using the decoded column address DCA.

In some example embodiments, the read/write circuit 240 may program the received data in the memory cell array 210. The read/write circuit 240 may read the data from the memory cell array 210 and provide the read data to the outside (for example, the controller 100). In some example embodiments, the read/write circuit 240 may include a configuration such as a detection amplifier, a write driver, a column selection circuit, and a page buffer.

The control logic 250 may be connected to the address decoder 220, the voltage generator 230, and the read/write circuit 240. The control logic 250 may control the operation of the nonvolatile memory 200. The control logic 250 may operate in response to a control signal CTRL and a command CMD (e.g., a write command, a read command, etc.) provided from the controller 100.

Referring to FIGS. 3 and 4, the memory cell array 210 may include a plurality of memory cells MC. The memory cells MC may be disposed along a row direction and a column direction. The memory cells MC may include, for example, a variable resistance element VR and a cell transistor CT.

A gate of the cell transistor CT may be connected to the word lines WL1 to WLn. The gates of the cell transistors CT disposed in the row direction may be commonly connected to a single word line (e.g., a first word line WL1). The gates of cell transistors CT of another row may be connected to other word lines.

One end of the cell transistor CT may be connected to one end of the variable resistance element VR. The other end of the cell transistor CT may be connected to a source line (e.g., a source line SL1 and a source line SL2). The other ends of a pair of adjacent cell transistors CT may be commonly connected to a single source line (e.g., the source line SL1).

One end and the other end of the variable resistance element VR may be connected to the bit lines BL1 to BLm. The other ends of the variable resistance elements VR arranged in the column direction may be commonly connected to a single bit line (e.g., the first bit line BL1).

The variable resistance element VR may have states of a low resistance state and a high resistance state depending on bias conditions. By adjusting the state of the variable resistance element VR to one state of the low resistance state and the high resistance state, data may be stored in the variable resistance element VR.

Referring to FIG. 4, the variable resistance element VR may include a free layer FL, a pinned layer PL, and a tunneling layer TL. In some example embodiments, the free layer FL, the pinned layer PL, and the tunneling layer TL may be disposed between the first bit line BL1 and the cell transistor CT. The tunneling layer TL may be disposed between the free layer FL and the pinned layer PL.

Figure 5:
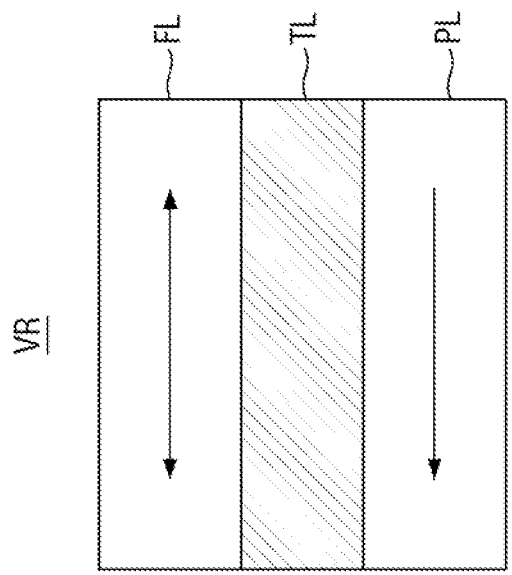
FIG. 5 is an example diagram showing a variable resistance element according to some example embodiments.

FIG. 5 is an example diagram showing a variable resistance element according to some example embodiments.

Referring to FIG. 5, a magnetization direction of the pinned layer PL may be fixed. A magnetization direction of the free layer FL may be the same as or opposite to the magnetization direction of the pinned layer PL, depending on the bias conditions.

When the magnetization direction of the free layer FL and the magnetization direction of the pinned layer PL are parallel to each other (the same direction), a resistance value of the variable resistance element VR may decrease. When the magnetization direction of the free layer FL and the magnetization direction of the pinned layer PL are anti-parallel, the resistance value of the variable resistance element VR may increase. The resistance differences may be used to indicate stored information, e.g., bits of data.

In some example embodiments, when a current flows from the free layer FL to the pinned layer PL, electrons may move from the pinned layer PL to the free layer FL. The electrons flowing in the pinned layer PL may turn along the magnetization direction of the pinned layer PL. The free layer FL may be magnetized by the electrons turning along the magnetization direction of the pinned layer PL. In some example embodiments, the free layer FL may be magnetized in the same direction as the magnetization direction of the pinned layer PL.

In some example embodiments, when a current flows from the pinned layer PL to the free layer FL, electrons may move from the free layer FL to the pinned layer PL. Some of the electrons injected into the pinned layer PL may be reflected from the pinned layer PL to the free layer FL. The reflected electrons may turn by the magnetization direction of the pinned layer PL. A turning direction of the reflected electrons may be opposite to the magnetization direction of the pinned layer PL. The free layer FL may be magnetized by the turning electrons. Thus, the free layer FL may be magnetized in the direction opposite to the magnetization direction of the pinned layer PL.

Figure 6:
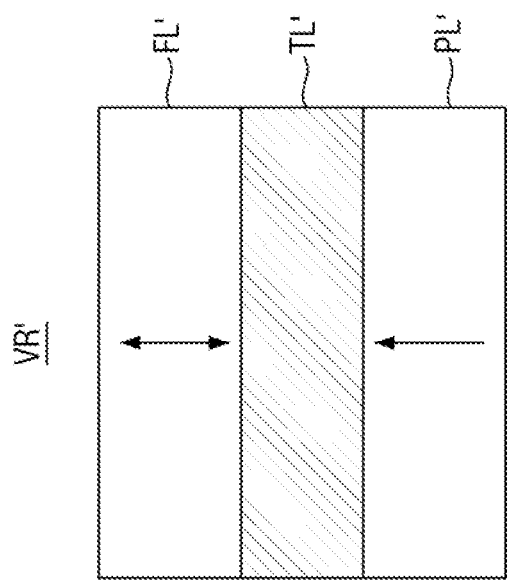
FIG. 6 is an example diagram showing a variable resistance element according to some example embodiments.

FIG. 6 is an example diagram showing a variable resistance element according to some example embodiments.

Referring to FIG. 6, a variable resistance element VR' may include a pinned layer PL', a free layer FL' and a tunneling layer TL'. Unlike the variable resistance element VR of FIG. 5, the pinned layer PL' and the free layer FL' of the variable resistance element VR' of FIG. 6 may have a perpendicular magnetization direction.

Referring to FIGS. 5 and 6, the free layers FL and FL' included in the memory cell MC may have the magnetization direction parallel to or opposite to the pinned layers PL and PL'.

Data to be written to the memory cell MC may differ, depending on the direction of the write current flowing through the variable resistance element VR.

In some example embodiments, when a current flows from the free layer FL to the pinned layer PL, the free layer FL is magnetized in the same direction as the magnetization direction of the pinned layer PL, the resistance value of the variable resistance element VR decreases, and data '0' may be written to the memory cell MC. In some example embodiments, when a current flows from the pinned layer PL to the free layer FL, the free layer FL is magnetized in the direction opposite to the magnetization direction of the pinned layer PL, the resistance value of the variable resistance element VR increases, and data '1' may be written to the memory cell MC.

Figure 7:
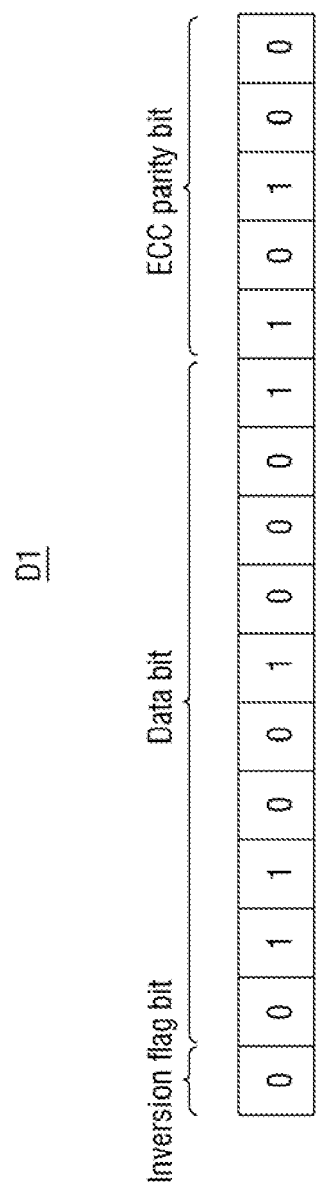
FIG. 7 is a diagram showing data according to some example embodiments.
Figure 8:
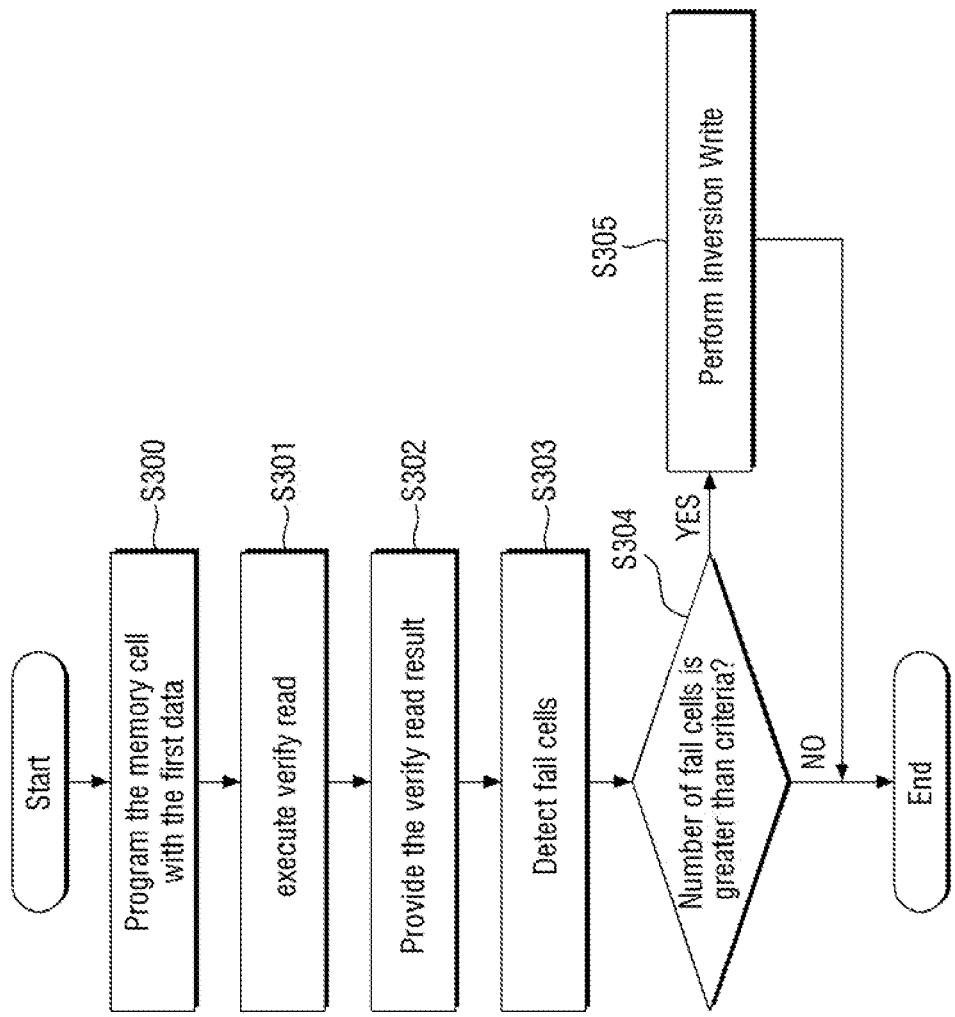
FIGS. 8 and 9 are flowcharts for explaining operations of the electronic device according to some example embodiments.
Figure 9:
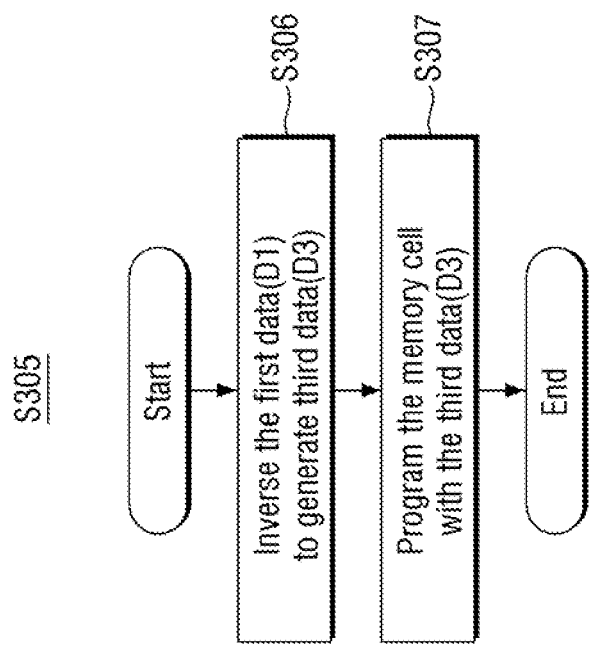

FIG. 7 is a diagram showing data according to some example embodiments. FIGS. 8 and 9 are flowcharts for explaining operations of the electronic device according to some example embodiments. FIG. 10 is a diagram showing data according to some example embodiments.

The number of fail cells that occur when data '0' is written to the memory cell MC may be greater than the number of fail cells that occur when data '1' is written to the memory cell MC. In other cases, the number of fail cells that occur when data '1' is written to the memory cell MC may be greater than the number of fail cells that occur when '0' is written to the memory cell MC. Here, the fail cells may mean memory cells that are programmed with specific data but are read as storing data that different from the specific data, i.e., the intended value to be written is read as another value. For example, when the data having a specific logical value (e.g., 0) is written to the memory cell MC, the data that is written may be read as different data (e.g., the read data may have a logical value that is 1).

According to some example embodiments, the data that is read from the memory cell MC may be compared with the data that is written thereto, and when the number of fail cells of the memory cell MC is greater than a reference value, the data to be written may be inversed and written.

Hereinafter, a process of programming a third data D3 obtained by inversing the first data D1 in the nonvolatile memory 200 will be explained with reference to FIGS. 7 to 13. Here, the program operation may include a write operation and an erase operation. The inversing operation may include an operation of changing the logical value of a specific bit to 1 when the logical value of a specific bit is 0, or an operation of changing the logical value of a specific bit to 0 when the logical value of a specific bit is 1.

Referring to FIG. 7, the first data D1 according to some example embodiments may include a plurality of bits. In some example embodiments, the first data D1 may include an inversion flag bit, one or more data bits, one or more ECC parity bits, and the like. The inversion flag bit, the data bit, and the ECC parity bit are all shown as the same data, e.g., a same data string, but may be data programmed in the memory cells MC different from each other. The first data D1 may be data that is transferred to the read/write circuit 240 of FIG. 2.

The inversion flag bit may indicate whether the first data D1 is inversed. In some example embodiments, when the first data D1 is not inversed, the inversion flag bit may have a logical value of 0. In some example embodiments, when the first data D1 is inversed, the inversion flag bit is also inversed, and the inversion flag bit may have a logical value of 1. The inversion flag bit may include a single bit, but the number of bits of the inversion flag bit may be varied.

The data bit may include specific information. In some example embodiments, the data bit may include information that the host 10 wants to store in the nonvolatile memory 200. The data bit may include a plurality of bits. The data bits may also be inversed.

The ECC parity bit may be used when correcting the error of the first data D1. The ECC parity bits may be generated by the error correction code module 120. The ECC parity bit may be used when correcting an error of the first data D1 by the error correction code module 120. The ECC parity bit may include a plurality of bits. The ECC parity bit may also be inversed.

Referring to FIGS. 8 to 10, the memory cell MC, e.g., a plurality of memory cells MC, may be programmed with first data D1 (S300). In some example embodiments, the controller 100 may control the first data D1 transferred from the host 10 to be programmed in the memory cell MC included in the nonvolatile memory 200.

A verify read may be performed on the memory cell(s) MC programmed with the first data D1 (S301). Performing of the verify read may be controlled by the controller 100, or the verify read may also be performed by, e.g., the nonvolatile memory 200 itself. As the verify read is performed, the second data D2 may be generated as a verify read result.

The result of the verify read, e.g., the second data D2, may be provided to the controller 100 (S302). In some example embodiments, the second data D2 including the result of the verify read may be transferred from the nonvolatile memory 200 to the controller 100.

The controller 100 may detect fail cells using the provided verify read result (S303). In some example embodiments, the inversion module 110 included in the controller 100 may detect fail cells using the transferred second data D2. Thus, the inversion module 110 may detect the number of bits having different logical values, by comparing the second data D2 with the first data D1. In some example embodiments, when the logical value of the specific bit of the first data D1 is '0' and the logical value of the corresponding bit of the second data D2 is '1', the inversion module 110 may detect the corresponding memory cell MC as a fail cell.

Referring to FIG. 10, for example, when comparing the first data D1 with the second data D2, it may be checked whether two corresponding bits, e.g., a programmed bit and a read bit at a same bit location, are different from each other. The two bits may be different and may be identified as a fail bit at the bit location. In this case, the memory cell MC corresponding to the fail bit may be detected as a fail cell.

In FIG. 10, although fail bits are detected only for data bits, fail bits may also be detected for the inversion flag bit or the ECC parity bit.

Referring to FIG. 8 again, the controller 100 may determine whether the number of detected fail cells is greater than a reference value, e.g., a reference number or positive integer (S304). In some example embodiments, the inversion module 110 of the controller 100 may determine whether the number of fail cells of the detected memory cells MC is greater than the reference value.

When the number of fail cells is equal to or less than the reference value (S304—NO), the process may end.

When the number of fail cells is greater than the reference value (S304—YES), the inversion write may be performed (S305). In some example embodiments, when the reference value is 3 and the number of fail cells is 4, the inversion write may be performed (S305).

Referring to FIGS. 9 and 10, the inversion write (S305) may include operations S306 and S307.

In some example embodiments, when the number of fail cells is greater than the reference value (S304—YES), the controller 100 may inverse the first data D1 to generate the third data D3 (S306), such that, e.g., if the logical value of the specific bit of the first data D1 is 0, the logical value of the specific bit of the corresponding third data D3 is inversed to be 1. Thus, the controller 100 may inverse the first data D1 other than the second data D2 to generate the third data D3. In some example embodiments, every bit of the first data D1 may be the inverse in corresponding bit locations in the third data D3.

The third data D3 may be programmed in the memory cell(s) MC (S307). In some example embodiments, the third data D3 obtained by inversing the first data D1 may be programmed in the memory cell(s) MC. In this case, an operation of erasing the existing programmed first data D1 may be included. In some example embodiments, the erase command and address may be transferred from the controller 100 to the nonvolatile memory 200.

When the number of detected fail cells is greater than the reference value, by performing the inversion write (programming the memory cell(s) MC with the third data D3 obtained by inversing the first data D1), the write error rate WER of the memory cell MC may be reduced. Thus, when the memory cell MC is written in a specific direction and the write error rate of that memory cell MC is high, by writing the memory cell MC in a direction opposite to the specific direction, the write error rate may decrease.

Also, by performing the inversion write only once, performance of repetitive writes may be reduced or eliminated, and the power consumed for data programming may decrease accordingly. As a result, the product reliability and efficiency of the memory device 20 including the memory cell MC may be improved.

Figure 11:
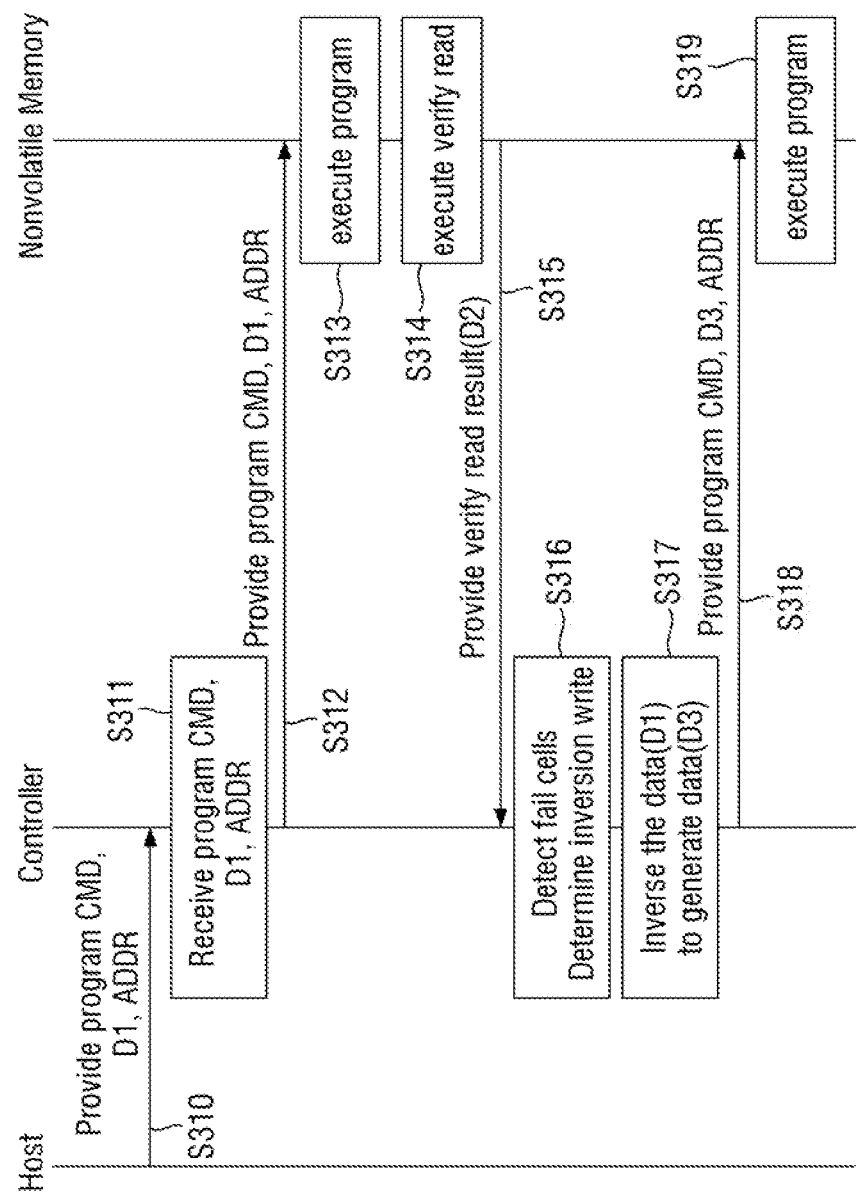
FIG. 11 is a flowchart for explaining an operation of the electronic device according to some example embodiments.
Figure 12:
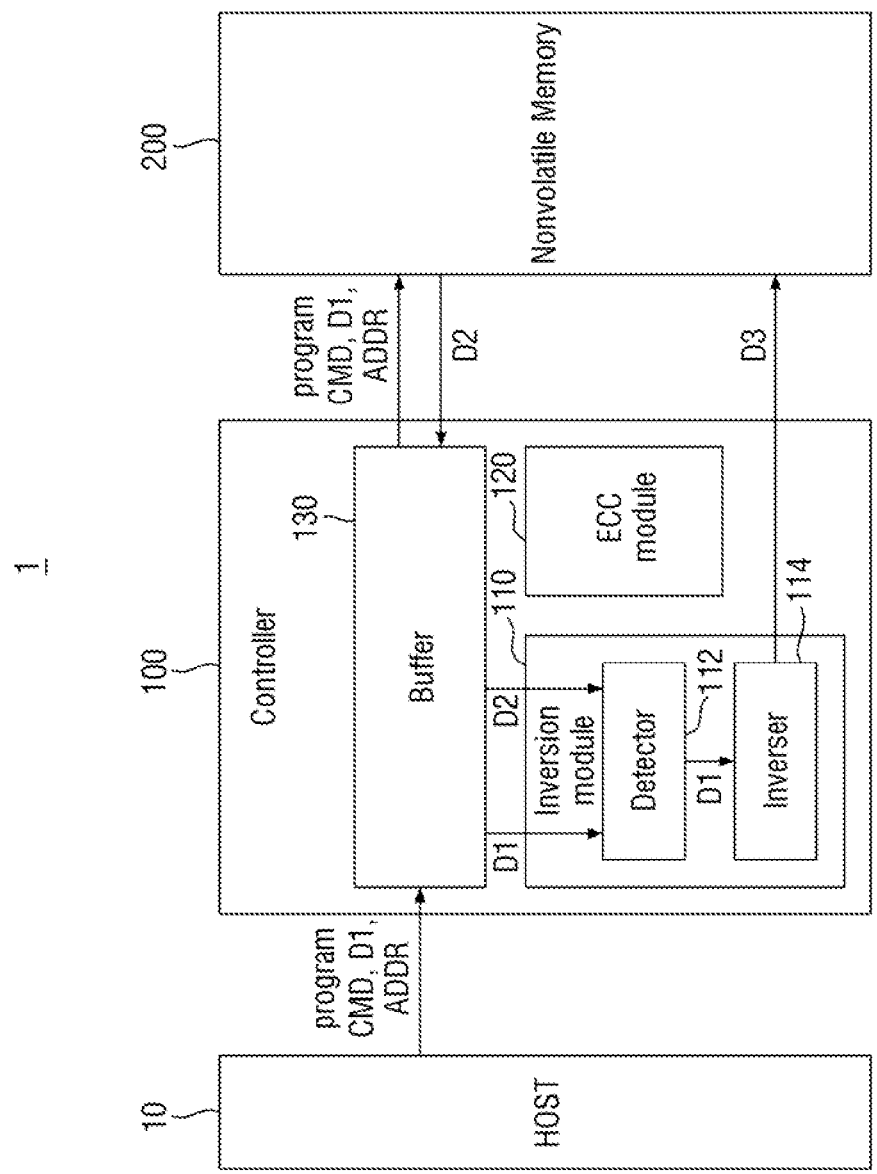
FIG. 12 is a diagram for explaining the operation of the electronic device according to some example embodiments.
Figure 13:
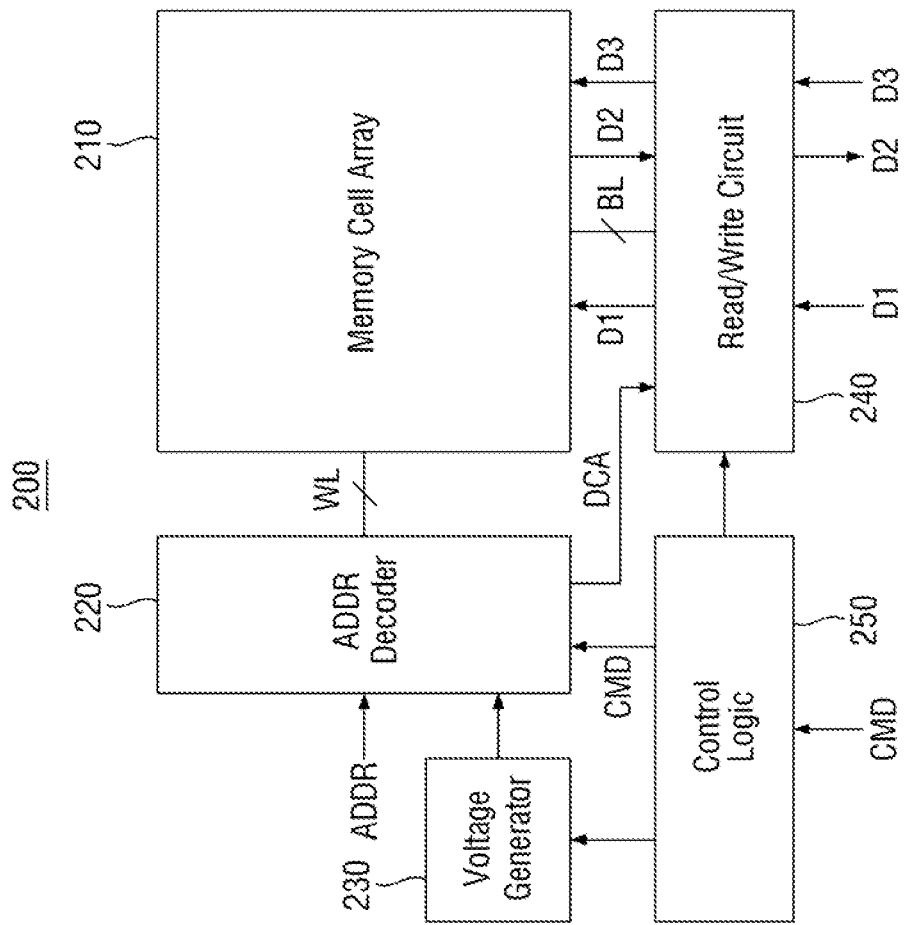
FIG. 13 is a diagram for explaining the operation of the nonvolatile memory according to some example embodiments.

FIG. 11 is a flowchart for explaining an operation of the electronic device according to some example embodiments. FIG. 12 is a diagram for explaining the operation of the electronic device according to some example embodiments. FIG. 13 is a diagram for explaining the operation of the nonvolatile memory according to some example embodiments.

Referring to FIGS. 11 to 13, the host 10 may provide the controller 100 with the program command program CMD, the first data D1, and the address ADDR (S310).

The controller 100 may receive the program command program CMD, the first data D1, and the address ADDR (S311). In some example embodiments, the buffer 130 may receive and temporarily store the program command program CMD, the first data D1, and the address ADDR.

The controller 100 may provide the nonvolatile memory 200 with the program command program CMD, the first data D1, and the address ADDR (S312). In some example embodiments, the buffer 130 may provide the program command program CMD to the control logic 250 of the nonvolatile memory 200, provide the first data D1 to the read/write circuit 240, and provide the address ADDR to the address decoder 220.

The nonvolatile memory 200 may perform a program on the basis of the received program command program CMD, the first data D1, and the address ADDR (S313). In some example embodiments, the word line WL connected to the memory cell array 210 is selected, the voltage is applied to the bit line BL, and the first data D1 may be programmed in the memory cell MC. The nonvolatile memory 200 may program the first data D1 in the memory cell MC corresponding to the address ADDR.

The nonvolatile memory 200 may perform a verify read on the programmed memory cell MC (S314). In some example embodiments, the read/write circuit 240 may provide the controller 100 with the second data D2 that is the verify read result that is read by applying the verify voltage to the memory cell MC included in the memory cell array 210. In some example embodiments, the verify read may be performed by the memory cell MC itself. Thus, the verify read may not be performed by the control of the controller 100. However, the verify read of the nonvolatile memory 200 may be performed by a verify read command provided from the controller 100. Also, the verify read command may be transmitted along with the program command.

The nonvolatile memory 200 may provide the controller 100 with the second data D2 that is the result of the verify read (S315). In some example embodiments, the nonvolatile memory 200 may provide the second data D2 to the buffer 130. The buffer 130 may temporarily store the second data D2.

The controller 100 may detect the fail cells and determine whether to perform inversion write (S316). In some example embodiments, the detector 112 of the inversion module 110 may receive the second data D2 and the first data D1 from the buffer 130. The detector 112 may detect the fail cells by comparing the first data D1 with the second data D2. The detector 112 may provide the first data D1 to the inverser 114 when the number of fail cells of the memory cell MC is greater than the reference value.

The controller 100 may inverse the first data D1 to generate the third data D3 (S317). In some example embodiments, the inverser 114 of the inversion module 110 may inverse the first data D1 to generate the third data D3.

The controller 100 may provide the nonvolatile memory 200 with the third data D3, the program command program CMD, and the address ADDR (S318). In some example embodiments, the inverser 114 of the inversion module 110 may provide the third data D3 to the nonvolatile memory 200. The third data D3, the program command program CMD and the address ADDR may be provided from the buffer 130 to the nonvolatile memory 200.

The nonvolatile memory 200 may perform the program on the memory cell MC on the basis of the third data D3, the program command program CMD, and the address ADDR (S319). In some example embodiments, a voltage is applied to the word line WL and the bit line BL connected to the memory cell array 210, and the third data D3 (obtained by inversing the first data D1) may be programmed in the memory cell(s) MC corresponding to the address ADDR.

The magnitude of the program voltage provided by the voltage generator 230 when the first data D1 is programmed may be different from the magnitude of the program voltage provided by the voltage generator 230 when the third data D3 is programmed. In some example embodiments, the magnitude of the program voltage provided by the voltage generator 230 when the third data D3 is programmed may be greater than the magnitude of the program voltage provided by the voltage generator 230 when the first data D1 is programmed. In some example embodiments, the power consumed when programming the memory cell MC with the third data D3 may be greater than that consumed when programming the memory cell MC with the first data D1.

Hereinafter, a process of performing the inversion read of the memory cell MC programmed with the third data D3 according to some example embodiments will be explained with reference to FIGS. 14 to 16.

Figure 14:
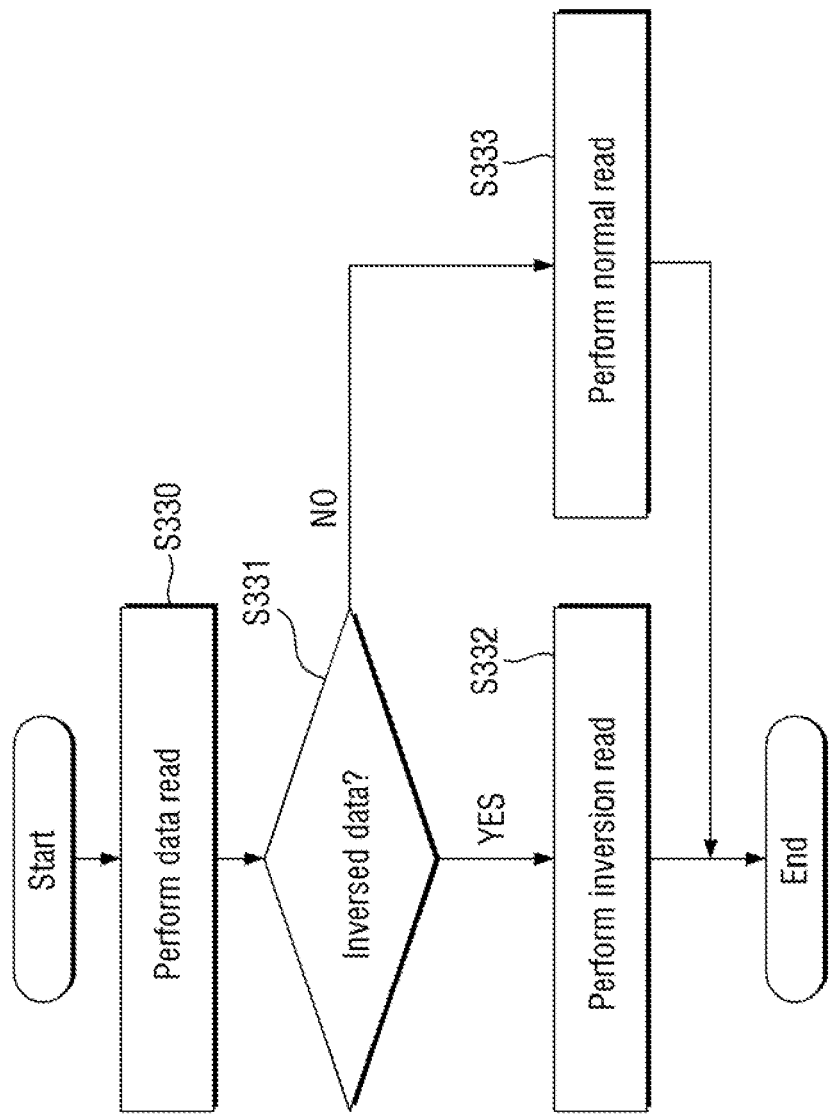
FIG. 14 is a flowchart for explaining an operation of the electronic device according to some example embodiments.
Figure 15:
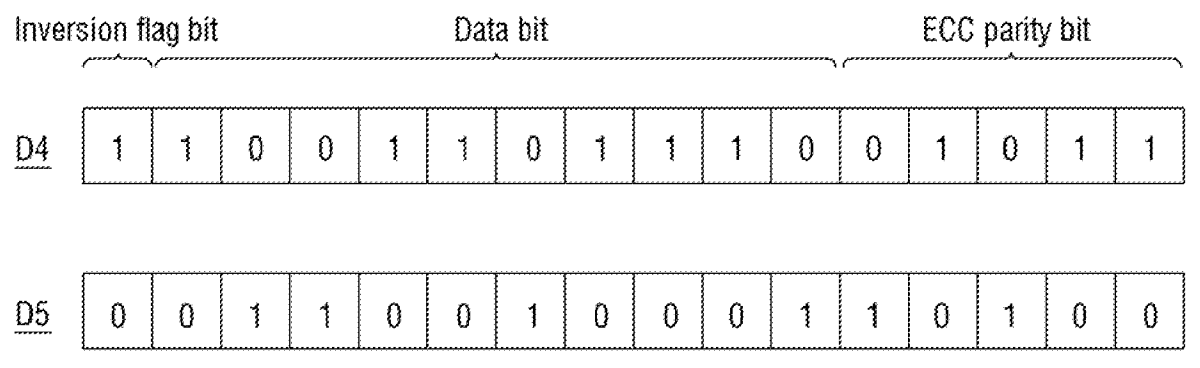

FIG. 14 is a flowchart for explaining an operation of the electronic device according to some example embodiments. FIG. 15 is a diagram showing data according to some example embodiments. FIG. 16 is a flowchart for explaining an operation of the electronic device according to some example embodiments.

Referring to FIG. 14, the controller 100 may control the nonvolatile memory 200 to read the data programmed in the memory cell(s) MC (S330). In some example embodiments, the controller 100 may provide a read command to the nonvolatile memory 200 to read the memory cell(s) MC programmed with the third data D3. In some example embodiments referring to FIG. 15, the result of reading may be fourth data D4. The fourth data D4 may be the same data as the third data D3. The read/write circuit 240 may provide the fourth data D4 to the controller 100 in response to application of voltage to the memory cell array 210.

Referring to FIG. 14 again, the controller 100 may check whether the transferred fourth data D4 is inversed data (S331). In some example embodiments, the detector 112 of the inversion module 110 included in the controller 100 may receive the fourth data D4 to check whether the fourth data D4 is inversed data.

The operation of checking whether the fourth data D4 is inversed data may include an operation of checking the inversion flag bit included in the fourth data D4. In some example embodiments, when the logical value of the inversion flag bit of the fourth data D4 is 0, the fourth data D4 is not inversed data, and when the logical value of the inversion flag bit of the fourth data D4 is 1, the fourth data D4 is inversed data.

When the fourth data D4 is not inversed data (S331— NO), the controller 100 may perform a normal read (S333). In some example embodiments, the controller 100 may provide the fourth data D4 to the host 10 without conversion.

When the fourth data D4 is inversed data (S331—YES), the controller 100 may perform the inversion read (S332). In some example embodiments referring to FIG. 15, the controller 100 may generate fifth data D5 obtained by inversing the fourth data D4. The controller 100 may provide the fifth data D5 to the host 10. The fifth data D5 may be the same as the first data D1 to be programmed. The host 10 may receive the data to be provided through the inversion read. In addition, the write error rate of the memory cell MC may decrease by inversing and programming the first data D1.

Figure 16:
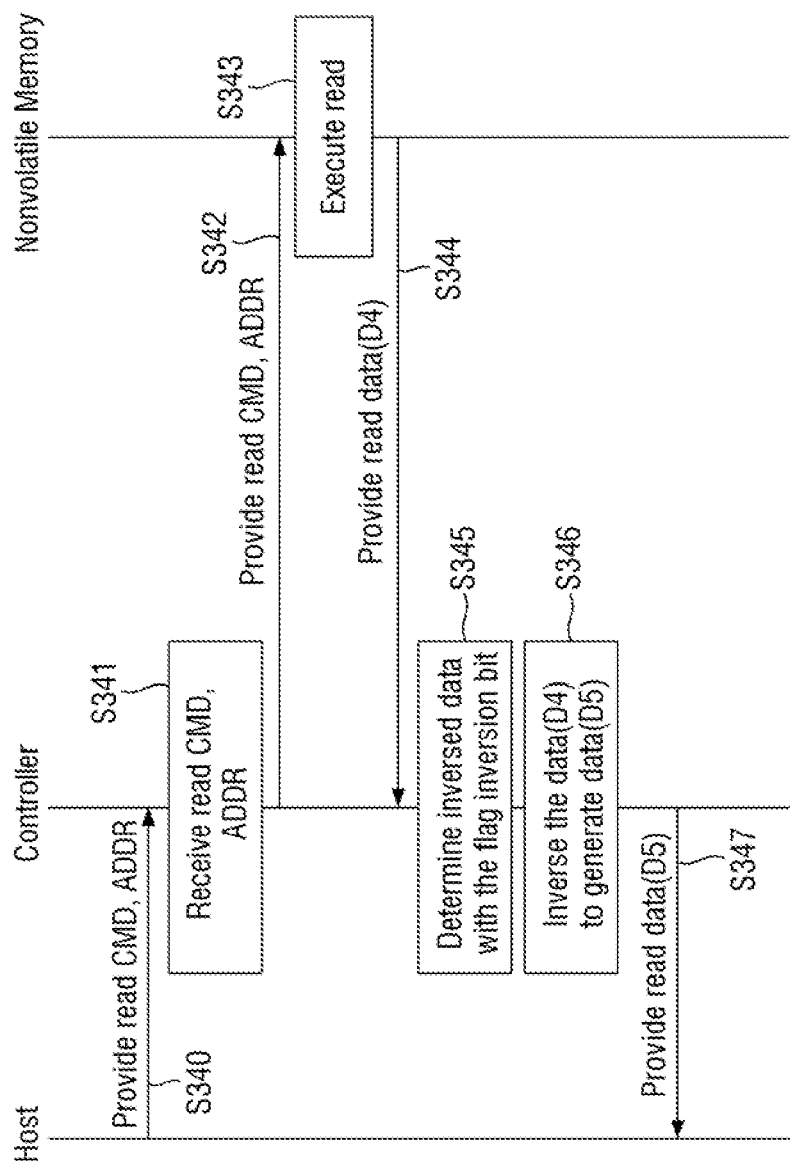
FIG. 16 is a flowchart for explaining an operation of the electronic device according to some example embodiments.

Referring to FIG. 16, the host 10 may provide a read command read CMD and an address ADDR to the controller 100 (S340). Here, the address ADDR may be the same as the address ADDR used in the program process.

The controller 100 may receive the read command read CMD and the address ADDR (S341). In some example embodiments, the buffer 130 included in the controller 100 may temporarily store the read command read CMD and an address ADDR.

The controller 100 may provide the read command read CMD and the address ADDR to the nonvolatile memory 200 (S342). In some example embodiments, the buffer 130 may provide the stored read command read CMD and the address ADDR to the nonvolatile memory 200. In some example embodiments, the buffer 130 may provide the read command read CMD to the control logic 250 and provide the address ADDR to the address decoder 220.

The nonvolatile memory 200 may perform the read operation (S343). In some example embodiments, the nonvolatile memory 200 may perform the read operation on the basis of the provided read command read CMD and address ADDR. A read voltage may be applied to the bit line BL connected to the memory cell MC to read the result thereof. In some example embodiments, the data that is read from the memory cell(s) MC programmed with the third data D3 may be the fourth data D4. The fourth data D4 may be the same data as the third data D3.

The nonvolatile memory 200 may provide the fourth data D4 (which is the read result) to the controller 100 (S344). In some example embodiments, the read/write circuit 240 may provide the fourth data D4 to the buffer 130 of the controller 100.

The controller 100 may determine whether the fourth data D4 is inversed data, using the flag inversion bit of the fourth data D4 (S345). When the logical value of the flag inversion bit of the fourth data D4 is 0, the fourth data D4 may be uninversed data, and when the logical value the flag inversion bit of the fourth data D4 is 1, the fourth data D4 may be inversed data.

When the fourth data D4 is the inversed data, the controller 100 may inverse the fourth data D4 to generate the fifth data D5 (S346). In some example embodiments, the inverser 114 of the inversion module 110 included in the controller 100 may inverse the fourth data D4 to generate fifth data D5.

The controller 100 may provide the fifth data D5 to the host 10 (S347). In some example embodiments, the inverser 114 may provide the fifth data D5 to the host 10 through the buffer 130. The fifth data D5 may be the same as the first data D1 to be programmed.

Hereinafter, a process of performing the inversion write after the error correction according to some example embodiments will be explained with reference to FIGS. 17 to 19.

Figure 17:
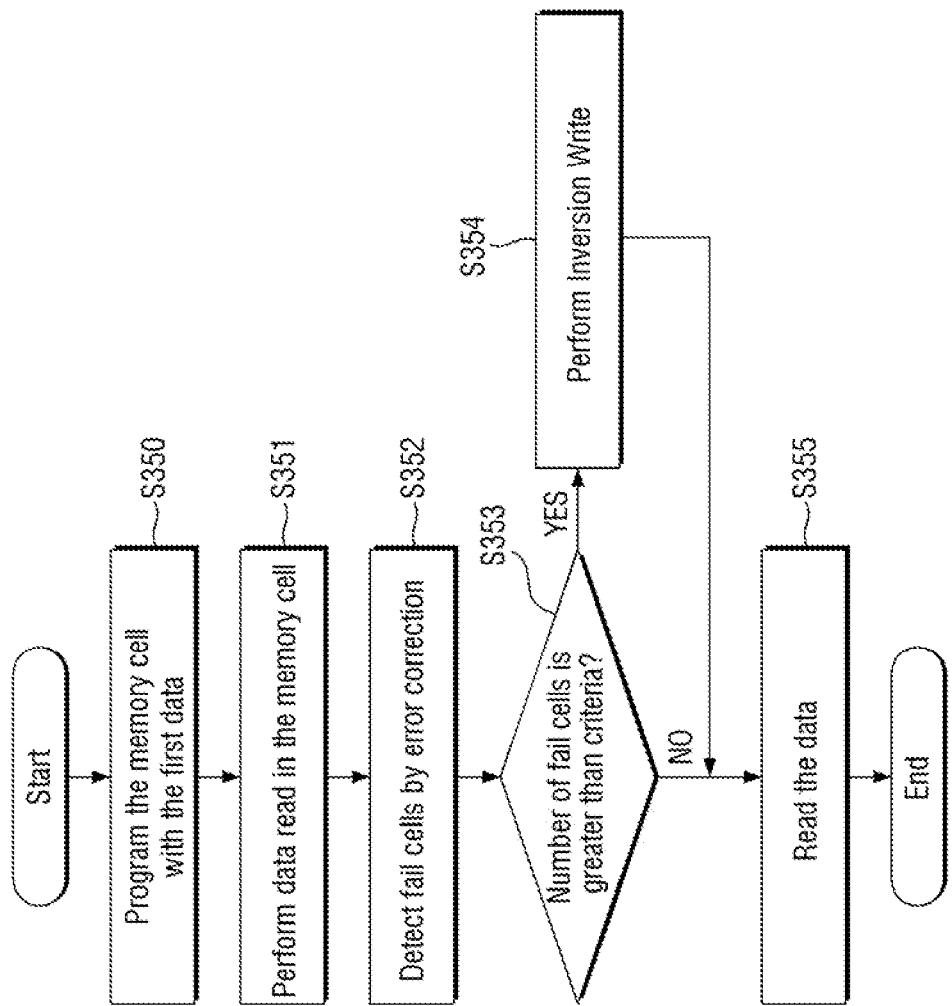
FIG. 17 is a flowchart for explaining an operation of the electronic device according to some example embodiments.

FIG. 17 is a flowchart for explaining an operation of an electronic device according to some example embodiments. FIG. 18 is a flowchart for explaining an operation of the electronic device according to some example embodiments. FIG. 19 is a diagram for explaining an operation of the electronic device according to some example embodiments. For the sake of convenience of explanation, repeated parts of contents explained using FIGS. 1 to 16 will be briefly explained or omitted.

Referring to FIG. 17, the memory cell(s) MC may be programmed with the first data D1 (S350). In some example embodiments, the controller 100 may control the nonvolatile memory 200 to program the memory cell(s) MC included in the memory cell array 210 with the first data D1. In this case, the first data D1 may include an ECC parity bit generated through the error correction code module 120. Unlike the process described with reference to FIGS. 1 to 16, this process may not perform the verify read. Thus, after programming the memory cell(s) MC with the first data D1, the verify read may not be performed.

The read operation of the memory cell(s) MC programmed with the first data D1 may be performed (S351). In some example embodiments, the controller 100 may control the nonvolatile memory 200 to read the memory cell(s) MC. A sixth data D6 generated by the read operation may be provided to the controller 100.

The error correction code module 120 included in the controller 100 may perform the error correction to detect fail cells (S352). In some example embodiments, the error correction code module 120 may detect fail bits, using the ECC parity bit of the transferred sixth data D6.

The controller 100 may check whether the number of detected fail cells of the memory cell(s) MC is greater than a reference value (S353). In some example embodiments, the error correction code module 120 provides the detection result to the detector 112 of the inversion module 110, and the detector 112 may check whether the number of fail cells is greater than the reference value. Further, for example, the detector 112 may be provided with the first data D1 from the buffer 130.

When the number of detected fail cells is greater than the reference value (S353—YES), the inversion write may be performed (S354). In some example embodiments, when the reference value is 3 and the number of detected fail cells is 4, the inversion write (S354) may be performed. In some example embodiments, the first data D1 is provided to the inverser 114 from the detector 112, and the inverser 114 may inverse the first data D1 to generate a seventh data D7. The generated seventh data D7 may be provided to the nonvolatile memory 200 and programmed in the memory cell(s) MC.

When the number of detected fail cells is smaller than or equal to the reference value (S353—NO) or when the number of detected fail cells is greater than the reference value (S353—YES) after the seventh data D7 is programmed in the cell MC, the read operation may be performed (S355). In some example embodiments, when the number of detected fail cells is smaller than or equal to the reference value (S353—NO), a normal read may be performed. In some example embodiments, when the number of detected fail cells is greater than the reference value (S353—YES), the inversion read may be performed.

Figure 18:
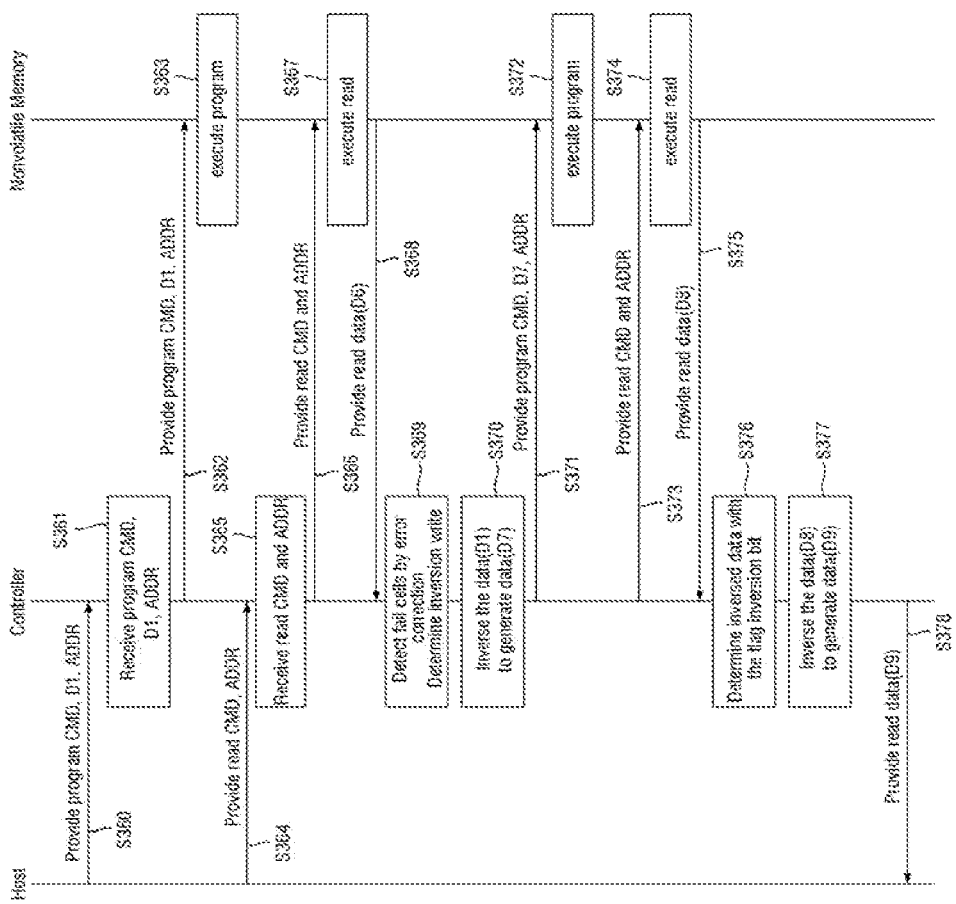
FIG. 18 is a flowchart for explaining an operation of the electronic device according to some example embodiments.
Figure 19:
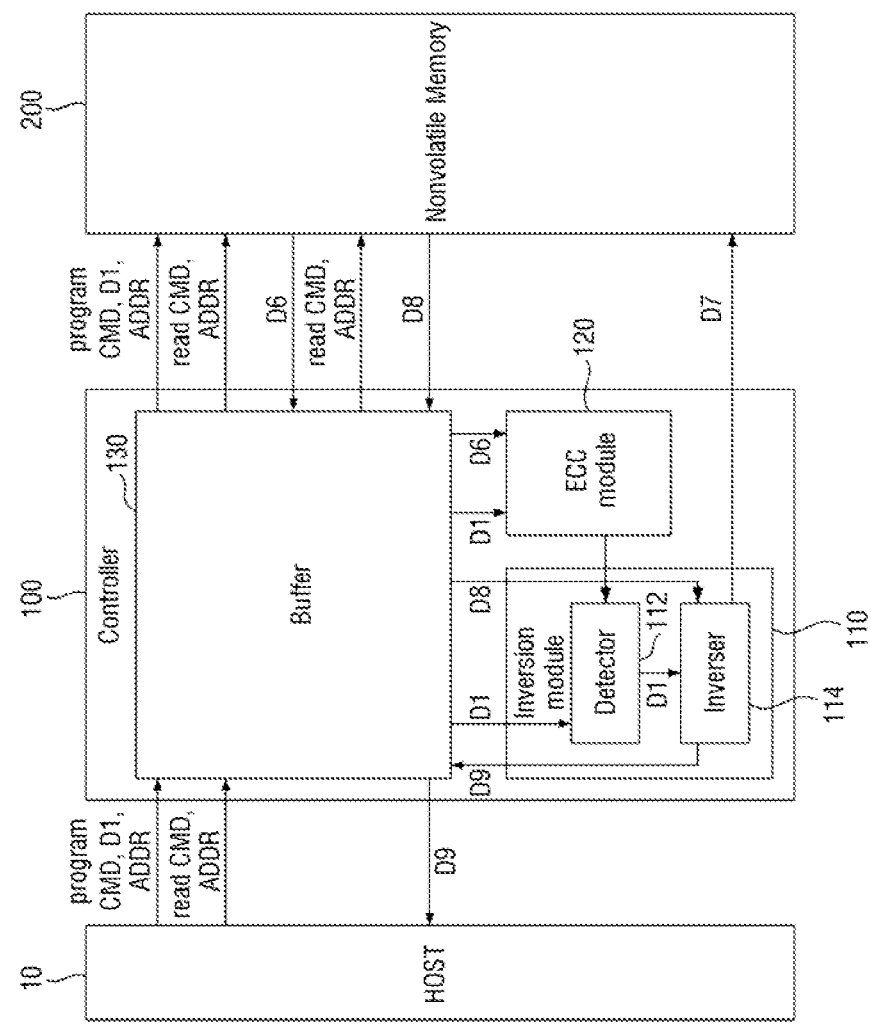
FIG. 19 is a diagram for explaining an operation of the electronic device according to some example embodiments.

Referring to FIGS. 18 and 19, the host 10 may provide the controller 100 with the program command program CMD, the first data D1, and the address ADDR (S360).

The controller 100 may receive the program command program CMD, the first data D1, and the address ADDR (S361). In some example embodiments, the buffer 130 may receive and temporarily store the program command program CMD, the first data D1, and the address ADDR.

The controller 100 may provide the nonvolatile memory 200 with the program command program CMD, the first data D1, and the address ADDR (S362). In some example embodiments, the buffer 130 may provide the program command program CMD to the control logic 250 of the nonvolatile memory 200, provide the first data D1 to the read/write circuit 240, and provide the address ADDR to the address decoder 220.

The nonvolatile memory 200 may perform a program on the basis of the received program command program CMD, the first data D1, and the address ADDR (S363). In some example embodiments a voltage may be applied to the word line WL and the bit line BL connected to the memory cell array 210 to program the memory cell(s) MC with the first data D1. The nonvolatile memory 200 may program the memory cell(s) MC corresponding to the address ADDR with the first data D1.

The host 10 may provide a read command read CMD and an address ADDR to the controller 100 (S364). The operation pf providing the read command read CMD and the address ADDR may be performed at any time point after the memory cell MC is programmed with the first data D1.

The controller 100 may receive the read command read CMD and the address ADDR (S365). In some example embodiments, the buffer 130 included in the controller 100 may temporarily store the read command read CMD and the address ADDR.

The controller 100 may provide the nonvolatile memory 200 with the read command read CMD and the address ADDR (S366). In some example embodiments, the buffer 130 may provide the nonvolatile memory 200 with the stored read command read CMD and address ADDR. In some example embodiments, the buffer 130 may provide the read command read CMD to the control logic 250 and provide the address ADDR to the address decoder 220.

The nonvolatile memory 200 may perform the read operation (S367). In some example embodiments, the nonvolatile memory 200 may perform the read operation on the basis of the provided read command read CMD and address ADDR. A read voltage may be applied to the bit line BL connected to the memory cell MC to read the result thereof. In some example embodiments, the data that is read from the memory cell(s) MC programmed with the first data D1 may be the sixth data D6.

The nonvolatile memory 200 may provide the controller 100 with the sixth data D6, which is the read result (S368). In some example embodiments, the read/write circuit 240 may provide the buffer 130 of the controller 100 with the sixth data D6.

The error correction code module 120 performs error correction to detect fail cells, and the inversion module 110 may determine the inversion write (S369). In some example embodiments, the sixth data D6 may be transferred from the buffer 130 to the error correction code module 120. The error correction code module 120 may perform the error correction to detect fail cells. The error correction code module 120 may provide the detector 112 of the inversion module 110 with the detection result of the fail cells. The detector 112 may check whether the number of fail cells is greater than the reference value, using the detection result of the fail cells. When the number of fail cells is greater than the reference value, the detector 112 may provide the first data D1 to the inverser 114.

The controller 100 may generate a seventh data D7 obtained by inversing the first data D1 (S370). In some example embodiments, the inverser 114 may generate the seventh data D7 obtained by inversing the provided first data D1.

The controller 100 may provide the nonvolatile memory 200 with the program command program CMD, the seventh data D7, and the address ADDR (S371). In some example embodiments, the seventh data D7 may be transferred from the inverser 114 to the read/write circuit 240 through the buffer 130.

The nonvolatile memory 200 may program the memory cell MC with the seventh data D7 on the basis of the provided program command program CMD, seventh data D7, and address ADDR (S372). The existing programmed first data D1 may be erased before programming the seventh data D7.

The controller 100 may provide the nonvolatile memory 200 with the read command read CMD and the address ADDR (S373). Here, the address ADDR may be the same as the address ADDR used when programming the first data D1 and the seventh data D7.

The nonvolatile memory 200 may perform the read operation (S374). In some example embodiments, the nonvolatile memory 200 may perform the read operation on the basis of the provided read command read CMD and address ADDR. A read voltage may be applied to the bit line BL connected to the memory cell MC to read the result thereof. In some example embodiments, the data that is read from the memory cell MC programmed with the seventh data D7 may be an eighth data D8. The eighth data D8 may be the same data as the seventh data D7.

The nonvolatile memory 200 may provide to the controller 100 with the eighth data D8, which is the read result (S375). In some example embodiments, the read/write circuit 240 may provide the buffer 130 of the controller 100 with the eighth data D8. In some example embodiments, the eighth data D8 may be provided to the inverser 114.

The controller 100 may determine whether the eighth data D8 is inversed data, using the flag inversion bit of the eighth data D8 (S376). When the logical value of the flag inversion bit of the eighth data D8 is 0, the eighth data D8 may be uninversed data, and when the logical value of the flag inversion bit of the eighth data D8 is 1, the eighth data D8 may be inversed data.

When the eighth data D8 is inversed data, the controller 100 may inverse the eighth data D8 to generate a ninth data D9 (S377). In some example embodiments, the inverser 114 of the inversion module 110 included in the controller 100 may inverse the eighth data D8 to generate the ninth data D9.

The controller 100 may provide the ninth data D9 to the host 10 (S378). In some example embodiments, the inverser 114 may provide the ninth data D9 to the host 10 through the buffer 130. The ninth data D9 may be the same as the first data D1 to be programmed.

Error correction is performed using the error correction code module 120, and when the number of fail cells of the memory cell MC is greater than the reference value, the memory cell MC may be programmed with the inversed data. Accordingly, the product reliability of the memory device 20 including the memory cell MC may be improved.

Figure 20:
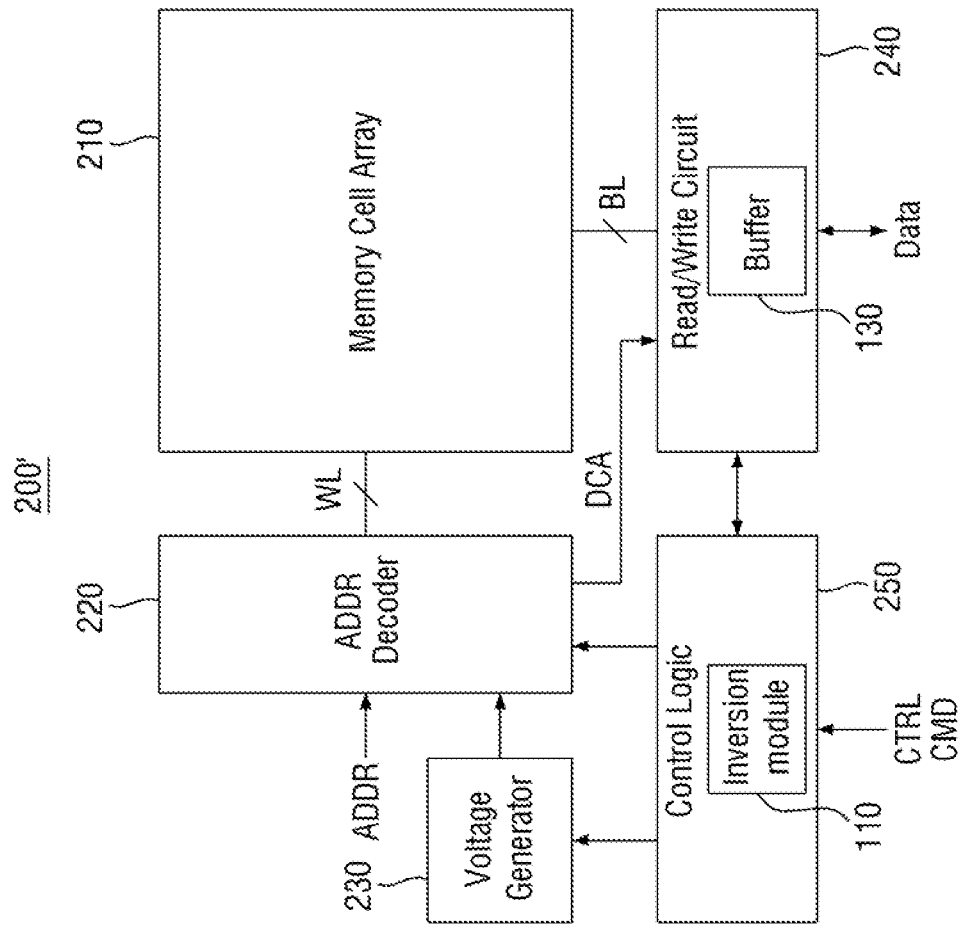
FIG. 20 is a block diagram for explaining a nonvolatile memory according to some example embodiments.

FIG. 20 is a block diagram for explaining a nonvolatile memory according to some example embodiments. For the sake of convenience of explanation, repeated parts of contents explained using FIGS. 1 to 16 will be briefly explained or omitted.

Referring to FIG. 20, a control logic 250 of a nonvolatile memory 200' may include an inversion module 110. Thus, while the controller 100 includes the inversion module 110 in FIGS. 1 to 16, the controller 100 of this embodiment may not include the inversion module 110. Further, a read/write circuit 240 of the nonvolatile memory 200' may include a buffer 130. Thus, while the controller 100 includes the buffer 130 in FIGS. 1 to 16, the controller 100 of this embodiment may not include the buffer 130.

Accordingly, the verify read, the detection of the fail cell, the determination of inversion write, the inversion write operation, the inversion of read data, and the like described using FIGS. 1 to 16 may be performed in the nonvolatile memory 200'. In some example embodiments, the controller 100 and the nonvolatile memory 200' may perform operations even without receiving or transmitting signals through the interface.

Figure 21:
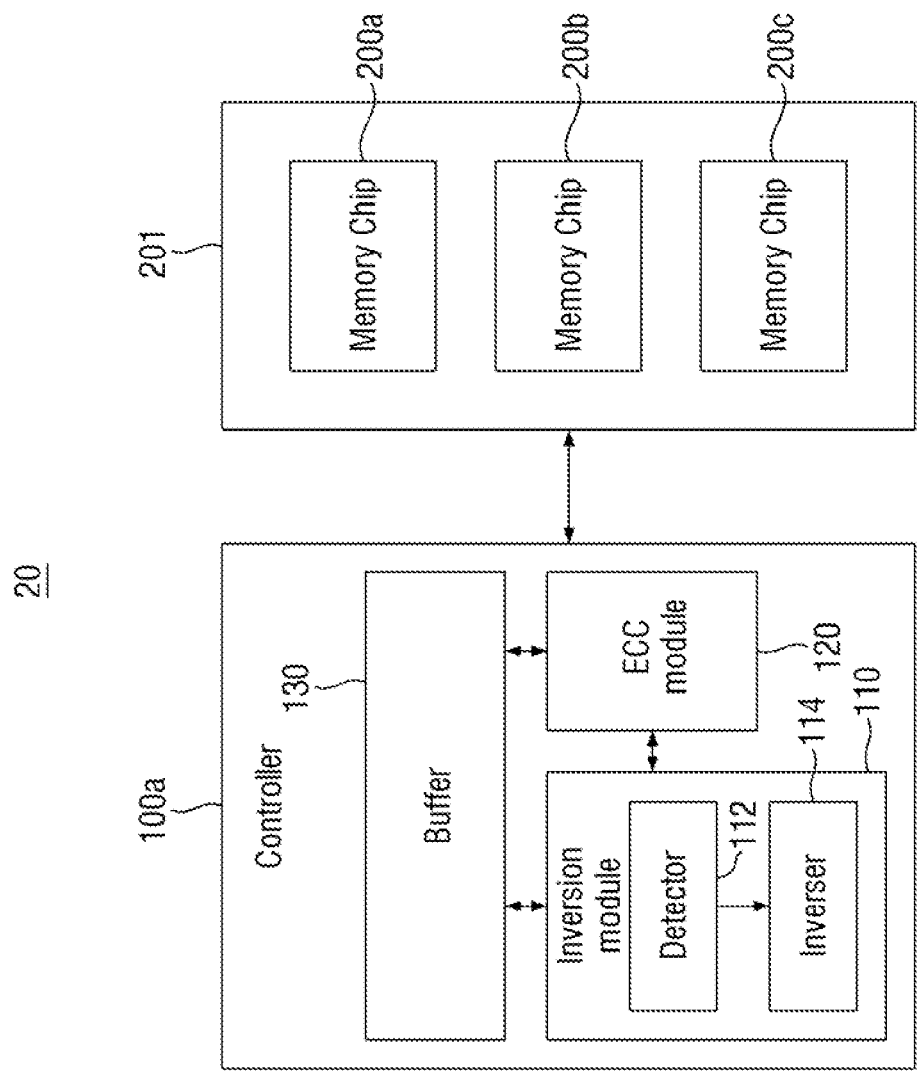
FIG. 21 is a block diagram for explaining a memory device according to some example embodiments.
Figure 22:
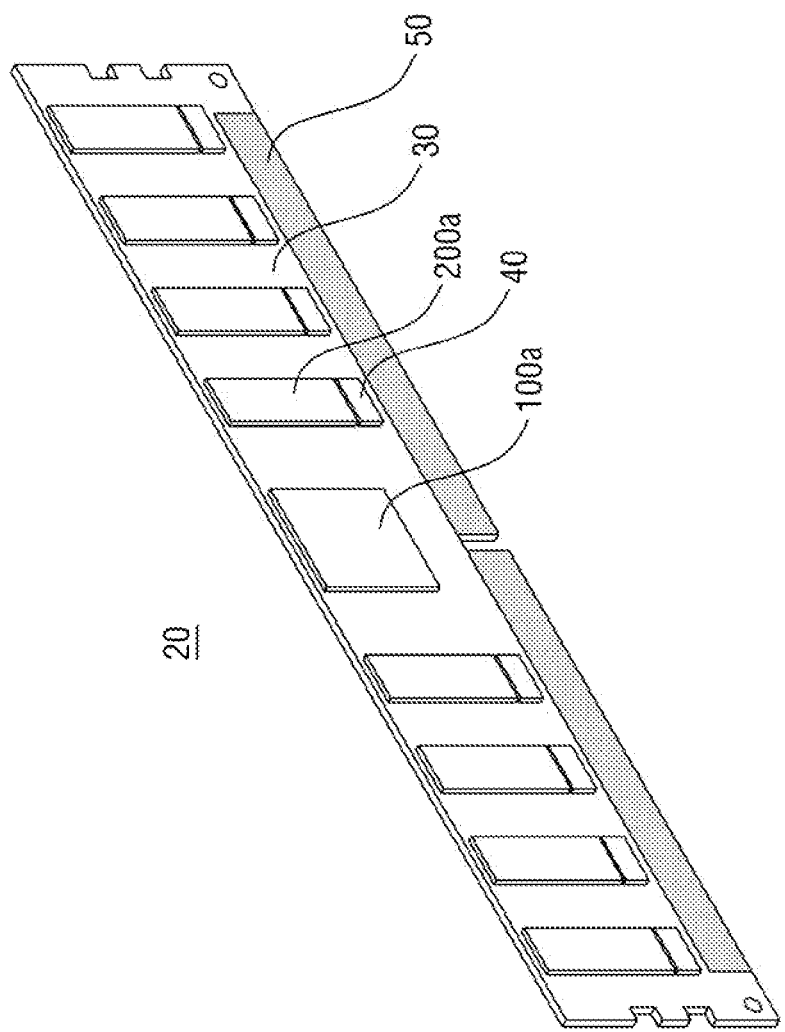
FIG. 22 is an example diagram showing a memory device according to some example embodiments.

FIG. 21 is a block diagram for explaining a memory device according to some example embodiments. FIG. 22 is an example diagram showing a memory device according to some example embodiments. For the sake of convenience of explanation, repeated parts of contents explained using FIGS. 1 to 20 will be briefly explained or omitted.

Referring to FIG. 21, the memory device 201 may include a controller 100a and a memory device 201. The memory device 201 may include a plurality of memory chips 200a, 200b, and 200c. In some example embodiments each of the plurality of memory chips 200a, 200b, and 200c may be the nonvolatile memory 200. The controller 100a may be the controller 100.

The plurality of memory chips 200a, 200b, and 200c may communicate with the controller 100a through a single channel, or the plurality of memory chips 200a, 200b, and 200c may communicate with the controller 100a through a plurality of channels.

The controller 100a may provide the respective memory chips 200a, 200b, and 200c with inversion data or non-inversion data. In some example embodiments, the controller 100a may detect the fail cell of the memory chip 200a, using the method described with reference to FIGS. 1 to 20. In addition, after detecting the fail cell, the controller 100a may provide the memory chip 200a with the data obtained by inversing the data to be programmed. In some example embodiments, the controller 100a may detect the fail cell of the memory chip 200b, using the method described with reference to FIGS. 1 to 20. Also, after detecting the fail cell, the controller 100a may provide the memory chip 200b with the data generated by not inversing the data to be programmed.

Referring to FIG. 22, the memory device 20 may include a printed circuit board 30, a plurality of memory chips 200a, a buffer 40, a connector 50, and a controller 100a.

A plurality of memory chips 200a may be combined on the printed circuit board 30. The connector 50 may be electrically connected to the plurality of memory chips 200a through a conductive line. The connector 50 may be connected to a slot of the host 10, and may connect the plurality of memory chips 200a to the host 10.

The controller 100a may be connected to the plurality of memory chips 200a through the buffer 40, and may control the plurality of memory chips 200a.

Figure 23:
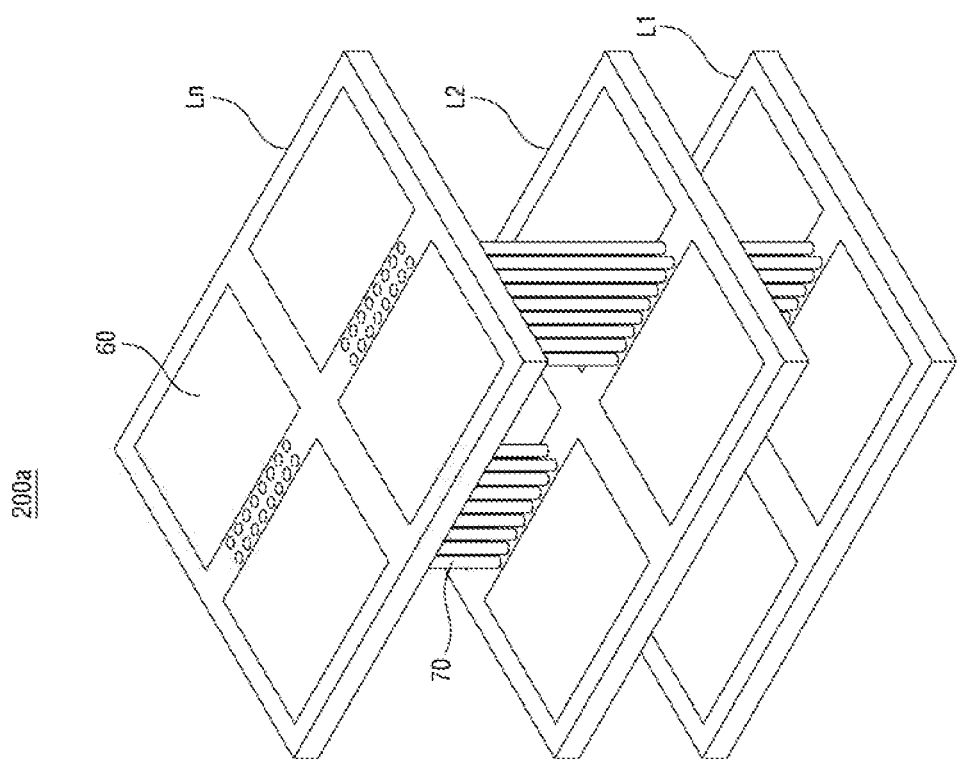
FIG. 23 is an example diagram showing a memory chip according to some example embodiments.

FIG. 23 is an example diagram showing a memory chip according to some example embodiments.

Referring to FIG. 23, the memory chip 200a may include a plurality of semiconductor layers L1 to Ln. The memory chip 200a may be each of the memory chips 200a, 200b, and 200c of FIGS. 21 and 22.

The plurality of semiconductor layers L1 to Ln may be electrically connected to each other through a penetration electrode 70 (e.g., through silicon via, TSVs). Each of the semiconductor layers L1 to Ln may include a memory cell array 60 including a nonvolatile memory. In some example embodiments, the memory cell array 60 may include the memory cell array 210 explained using FIG. 2.

As described above, embodiments may provide a memory device in which a write error rate is reduced and product reliability is improved.

As described above, embodiments may also provide an electronic device in which a write error rate is reduced and product reliability is improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A memory device, comprising:
a first nonvolatile memory including a resistive memory cell; and
a controller configured to control the first nonvolatile memory,
wherein:
the controller is configured to provide the first nonvolatile memory with a first data, a first program command, and a first address,
the controller is configured to receive a second data, which is a verify read from the resistive memory cell programmed with the first data, from the first nonvolatile memory in response to the first program command,
the controller is configured to compare bits of the first data with corresponding bits of the second data to detect a number of fail bits in the second data, which represents a number of fail cells, and compare the number of fail cells to a reference value, the reference value being an integer of 1 or more,
when the number of fail cells is greater than the reference value, the controller is configured to generate a third data obtained by inversing the first data, and provide the third data to the first nonvolatile memory, and when the number of detected fail cells is less than or equal to the reference value, the controller does not generate the third data obtained by inversing the first data,
the first data includes an inversion flag bit,
the resistive memory cell is configured to store a first state, and a second state different from the first state,
the first state has a logical value of 0, and the second state has a logical value of 1, and
a write error rate when the first state is stored in the resistive memory cell is greater than a write error rate when the second state is stored in the resistive memory cell.

2. The memory device as claimed in claim 1, wherein the resistive memory cell includes a magnetic RAM.

3. The memory device as claimed in claim 1, wherein:
the first data includes a data bit and an ECC parity bit, and
the detected fail cell includes a memory cell corresponding to the ECC parity bit.

4. The memory device as claimed in claim 1, wherein the controller is configured to provide the first nonvolatile memory with an erase command together with the third data.

5. The memory device as claimed in claim 1, wherein the controller is configured to provide the first nonvolatile memory with a verify read command of the first data, and receive the second data in response to the verify read command.

6. The memory device as claimed in claim 1, wherein:
the controller is configured to provide the first nonvolatile memory with a first read command and the first address,
the controller is configured to receive a fourth data including the inversion flag bit, which is read from the resistive memory cell programmed with the third data, from the first nonvolatile memory in response to the first read command, and
the controller is configured to inverse the fourth data when a logical value of the inversion flag bit of the provided fourth data is different from a logical value of the inversion flag bit of the first data.

7. The memory device as claimed in claim 6, wherein:
the controller includes an error correction code module,
the controller is configured to provide the first nonvolatile memory with a fifth data, a second program command, and a second address,
the controller is configured to provide the first nonvolatile memory with a second read command and the second address,
the controller is configured to receive a sixth data that is read from the resistive memory cell programmed with the fifth data in response to the second read command, and
the error correction code module is configured to perform an error correction on the sixth data to detect a fail cell, generate a seventh data obtained by inversing the fifth data when the number of detected fail cells is greater than the reference value, and provide the seventh data to the first nonvolatile memory.

8. The memory device as claimed in claim 7, further comprising a second nonvolatile memory different from the first nonvolatile memory,
wherein:
the second nonvolatile memory includes the resistive memory cell,
the controller is configured to provide the second nonvolatile memory with the first data, a third program command, and a third address,
the controller is configured to receive an eighth data, which is a verify read from the resistive memory cell programmed with the first data, from the second nonvolatile memory in response to the third program command,
the controller is configured to compare the first data with the eighth data to detect the number of fail cells,
the controller is configured to provide the first data to the second nonvolatile memory, and
the eighth data includes an inversion flag bit.

9. A memory device, comprising:
a memory cell array including a resistive memory cell;
a read/write circuit connected to the memory cell array through a bit line;
an address decoder connected to the memory cell array through a word line; and
a control logic connected to the read/write circuit and the address decoder,
wherein:
the read/write circuit is connected to a controller,
the read/write circuit is configured to receive a first data including an inversion flag bit,
the control logic is configured to receive a first program command,
the address decoder is configured to receive a first address, the read/write circuit, the control logic, and the address decoder are configured to program the resistive memory cell, on the basis of the first data, the first program command, and the first address, the read/write circuit is configured to provide the controller with a second data generated by applying a verify voltage to the bit line to which the resistive memory cell is connected, the read/write circuit is configured to receive a third data obtained by inversing the first data, from the controller in response to the second data, when a number of fail cells, which is determined by comparing bits of the first data with corresponding bits of the second data, is greater than a reference value, the reference value being an integer of 1 or more, the read/write circuit, the control logic, and the address decoder are configured to program the resistive memory cell, on the basis of the third data, the first program command and the first address, the resistive memory cell is configured to store a first state, and a second state different from the first state, the first state has a logical value of 0, and the second state has a logical value of 1, and a write error rate when the first state is stored in the resistive memory cell is greater than a write error rate when the second state is stored in the resistive memory cell.

10. The memory device as claimed in claim 9, further comprising a voltage generator that is configured to provide the address decoder with a first program voltage and a second program voltage, wherein a magnitude of the first program voltage for programming the resistive memory cell on the basis of the first data is different from a magnitude of the second program voltage for programming the resistive memory cell on the basis of the third data.

11. The memory device as claimed in claim 10, wherein a power consumed when programming the resistive memory cell with the third data is greater than a power consumed when programming the resistive memory cell with the first data.

12. The memory device as claimed in claim 9, wherein the resistive memory cell includes a magnetic RAM.

13. The memory device as claimed in claim 9, wherein the read/write circuit is configured to apply a read voltage to the bit line to receive a fourth data including the inversion flag bit from the resistive memory cell programmed with the third data, and provide the controller with a fifth data obtained by inversing the received fourth data.

14. The memory device as claimed in claim 13, wherein a logical value of the inversion flag bit of the fourth data is different from a logical value of the inversion flag bit of the first data.

15. An electronic device, comprising:
a nonvolatile memory including a resistive memory cell;
a controller that is configured to control the nonvolatile memory; and
a host that is configured to provide the controller with a program command and a read command,
wherein:
the controller is configured to provide the nonvolatile memory with a first data, the program command, and an address, the controller is configured to receive a second data that is a verify read from the resistive memory cell programmed with the first data, from the nonvolatile memory in response to the program command, the controller is configured to provide the nonvolatile memory with a third data obtained by inversing the first data, when a number of fail cells, which is determined by comparing bits of the first data with corresponding bits of the second data, is greater than a reference value, the reference value being an integer of 1 or more, the nonvolatile memory is configured to program the resistive memory cell with the third data, the host is configured to provide the controller with the read command and the address, the controller is configured to provide the nonvolatile memory with the read command and the address, receive a fourth data obtained by reading the resistive memory cell from the nonvolatile memory in response to the read command, and provide the host with a fifth data obtained by inversing the fourth data, the first data includes an inversion flag bit, the resistive memory cell is configured to store a first state, and a second state different from the first state, a logical value of the first state is 0, and a logical value of the second state is 1, and a write error rate when the first state is stored in the resistive memory cell is greater than a write error rate when the second state is stored in the resistive memory cell.

16. The electronic device as claimed in claim 15, wherein:
the fourth data includes the inversion flag bit, and
a logical value of the inversion flag bit of the first data is different from a logical value of the inversion flag bit of the fourth data.

17. The electronic device as claimed in claim 15, wherein the resistive memory cell includes a magnetic RAM.

18. The memory device as claimed in claim 1, wherein the reference value is 3, and the controller generates the third data for an inversion write when the number of fail cells is 4.

* * * * *